(12) United States Patent
Sun et al.

(10) Patent No.: US 10,904,051 B2
(45) Date of Patent: Jan. 26, 2021

(54) METHOD FOR SENDING CARRIER INFORMATION, BASE STATION, AND TERMINAL

(71) Applicant: Huawei Technologies Co., Ltd., Shenzhen (CN)

(72) Inventors: Wei Sun, Shenzhen (CN); Zhiheng Guo, Beijing (CN); Xinqian Xie, Beijing (CN); Xingqing Cheng, Beijing (CN); Lei Wan, Beijing (CN); Lei Guan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/517,282

(22) Filed: Jul. 19, 2019

(65) Prior Publication Data

US 2019/0342130 A1 Nov. 7, 2019

Related U.S. Application Data

(63) Continuation of application No. PCT/CN2018/073489, filed on Jan. 19, 2018.

(30) Foreign Application Priority Data

Jan. 26, 2017 (CN) .......................... 2017 1 0061830
Feb. 15, 2017 (CN) .......................... 2017 1 0082170

(51) Int. Cl.
*H04L 27/00* (2006.01)
*H04W 76/27* (2018.01)
*H04L 27/26* (2006.01)

(52) U.S. Cl.
CPC ...... *H04L 27/0014* (2013.01); *H04L 27/2666* (2013.01); *H04W 76/27* (2018.02);
(Continued)

(58) Field of Classification Search
CPC ............. H04L 27/0014; H04L 27/2666; H04L 2027/0026; H04L 2027/0083; H04W 76/27
(Continued)

(56) References Cited

U.S. PATENT DOCUMENTS 8,964,589 B2    2/2015  Li et al.
10,356,773 B2 *  7/2019  Chen ..................... H04L 5/0094
(Continued)

FOREIGN PATENT DOCUMENTS

CN    101394263 A    3/2009
CN    102905361 A    1/2013
(Continued)

OTHER PUBLICATIONS

Samsung, "LTE-NR Coexistence," 3GPP TSG RAN WG1 #87, R1-1613034, Reno, USA, Nov. 14-18, 2016, 3 pages.
(Continued)

*Primary Examiner* — Helene E Tayong
(74) *Attorney, Agent, or Firm* — Slater Matsil, LLP

(57) ABSTRACT

Embodiments of this application provide a method for sending carrier information, and the method includes: performing, by a base station, subcarrier mapping on a first carrier in a first subcarrier mapping manner, where subcarriers corresponding to the first subcarrier mapping manner have frequency offset of a first offset value relative to subcarriers corresponding to a second subcarrier mapping manner, and the subcarriers corresponding to the second subcarrier mapping manner are symmetric with respect to a carrier center frequency of the first carrier, and include no subcarrier on the carrier center frequency of the first carrier; and sending, by the base station, indication information to a terminal, where the indication information carries information about the first offset value.

30 Claims, 9 Drawing Sheets

(52) U.S. Cl.
CPC ................ *H04L 2027/0026* (2013.01); *H04L 2027/0083* (2013.01)

(58) Field of Classification Search
USPC ........................................................ 375/326
See application file for complete search history.

(56) References Cited

U.S. PATENT DOCUMENTS

| | | | |
|---|---|---|---|
| 2013/0094409 A1 | 4/2013 | Li et al. | |
| 2013/0229955 A1* | 9/2013 | Xu | H04W 52/18 370/280 |
| 2013/0250818 A1* | 9/2013 | Gaal | H04W 56/00 370/277 |
| 2016/0254869 A1 | 9/2016 | Wen et al. | |
| 2017/0251455 A1* | 8/2017 | Shin | H04L 5/001 |
| 2018/0098293 A1* | 4/2018 | Jiang | H04L 27/0014 |

FOREIGN PATENT DOCUMENTS

| | | |
|---|---|---|
| CN | 104639486 A | 5/2015 |
| CN | 105049386 A | 11/2015 |
| CN | 105451340 A | 3/2016 |
| CN | 105493549 A | 4/2016 |
| CN | 106376050 A | 2/2017 |
| JP | 2018504795 A | 2/2018 |
| JP | 2019503622 A | 2/2019 |
| WO | 2016048625 A1 | 3/2016 |
| WO | 2016070903 A1 | 5/2016 |
| WO | 2016119440 A1 | 8/2016 |

OTHER PUBLICATIONS

3rd Generation Partnership Project; Technical Specification Group Radio Access Network; Evolved Universal Terrestrial Radio Access (E-UTRA); Base Station (BS) radio transmission and reception (Release 14), 3GPP TS 36.104 V14.2.0 (Dec. 2016), 218 pages.

Huawei et al., "Band and channel arrangement for E-UTRA E1900 band", 3GPP TSG-RAN WG4 Meeting Ad Hoc #4, R4-103929, Oct. 11-15, 2010, 2 pages.

Neul, "On subcarrier mapping within PRB grid", 3GPP TSG RAN WG1 Meeting #88bis, R1-1704812, Apr. 3-7, 2017, 6 pages.

Huawei et al., "Subcarrier mapping for LTE-NR coexistence", 3GPP TSG RAN WG1 NR Ad Hoc Meeting, R1-1709980, Jun. 27-30, 2017, 14 pages.

Huawei et al., "Frequency location of the synchronization signals," 3GPP TSG RAN WG1 NR Ad Hoc Meeting, R1-1700038, Spokane, WA, USA, Jan. 16-20, 2017, 7 pages.

Panasonic, "Discussion on frequency domain frame structure for NR," 3GPP TSG RAN WG1 Meeting #87, R1-1611892 Reno, NV, USA, Nov. 14-18, 2016, 5 pages.

Huawei, "Email discussion [86b-20] on synchronization and carrier rasters for NR," 3GPP TSG RAN WG1 Meeting #87, R1-1611684Reno, NV, USA, Nov. 14-18, 2016, 11 pages.

\* cited by examiner

METHOD FOR SENDING CARRIER INFORMATION, BASE STATION, AND TERMINAL

CROSS-REFERENCE TO RELATED APPLICATIONS

This application is a continuation of International Application No. PCT/CN2018/073489, filed on Jan. 19, 2018, which claims priority to Chinese Patent Application No. 201710061830.9, filed on Jan. 26, 2017, and claims priority to Chinese Patent Application No. 201710082170.2, filed on Feb. 15, 2017. The disclosures of the aforementioned applications are hereby incorporated by reference in their entireties.

TECHNICAL FIELD

Embodiments of this application relate to the communications field, and more specifically, to a method for sending carrier information, a base station, a subcarrier determining method, and a terminal.

BACKGROUND

A next-generation communications technology, such as 5G, requires a low frequency carrier to provide better coverage and meet a mobility requirement. However, an existing frequency band below 6 GHz has been already allocated to an existing communications system such as a long term evolution (LTE) system.

A carrier is used in two manners on the frequency band below 6 GHz for a 5G new radio (NR) technology. One manner is frequency band redivision, and a new frequency band is allocated to NR for use. Frequency band redivision is a relatively complex and long-term process. In addition, a problem of adjacent-frequency deployment between NR and LTE needs to be considered, and this affects an actual deployment and commercial time of NR. The other possible manner is that NR and LTE share a carrier.

In the manner of sharing a carrier by NR and LTE, earlier deployment and commercialization of NR can be implemented while coverage and the mobility requirement of NR are ensured. However, different subcarrier mapping manners are possibly used for NR and LTE, and consequently inter-subcarrier interference occurs when NR and LTE share a carrier. This severely affects performance of NR and LTE.

SUMMARY

Embodiments of this application provide a method for sending carrier information, to avoid, as much as possible, inter-subcarrier interference that may occur when different subcarrier mapping manners exist.

According to a first aspect, an embodiment of this application provides a method for sending carrier information. The method includes performing, by a base station, subcarrier mapping on a first carrier in a first subcarrier mapping manner, where subcarriers corresponding to the first subcarrier mapping manner have frequency offset of a first offset value relative to subcarriers corresponding to a second subcarrier mapping manner, and the subcarriers corresponding to the second subcarrier mapping manner are symmetric with respect to a carrier center frequency of the first carrier, and include no subcarrier on the carrier center frequency of the first carrier. The method also includes sending, by the base station, indication information to a terminal, where the indication information carries information about the first offset value. A same subcarrier mapping manner is used for the first carrier, so that inter-subcarrier interference caused by coexistence of different subcarrier mapping manners can be reduced or eliminated. When a communication mode corresponding to the first subcarrier mapping manner and a communication mode corresponding to the second subcarrier mapping manner share a carrier, the base station may perform subcarrier mapping on the shared carrier in the first subcarrier mapping manner, to reduce or eliminate inter-subcarrier interference, caused by coexistence of different subcarrier mapping manners, on a base station side. For example, when NR and LTE share a carrier, the base station adjusts a mapping manner of NR subcarriers in the shared carrier, so that the NR subcarriers are mapped in a subcarrier mapping manner of LTE, thereby avoiding interference between subcarriers of NR and LTE in the shared carrier. The base station sends the indication information to the terminal, so that the terminal can obtain an actual frequency location for NR subcarrier mapping. In this way, the terminal can perform frequency synchronization more accurately, thereby avoiding a transmission failure resulting from a frequency sampling failure that is caused by different subcarrier mapping frequency values determined by the terminal and the base station.

Further, the indication information further includes an evolved universal terrestrial radio access absolute radio frequency channel number (EARFCN) of the first carrier.

The indication information may be carried in a system message or RRC signaling for sending.

In a possible design, the information about the first offset value includes a first value or a second value. The first value indicates that the first offset value is 0. The second value indicates that the first offset value is +7.5 KHz, or the second value indicates that the first offset value is −7.5 KHz. Further, the indication information further carries information about a second offset value. The second offset value indicated by the information about the second offset value meets a formula X−floor(X/Raster+0.5)*Raster, or meets a formula X−floor(X/Raster)*Raster, where floor( ) means rounding down, X is an integer multiple of 100 KHz, a value of X ranges from 0 KHz to (Y−100) KHz, Y is a common multiple of 100 KHz and Raster, Raster is a value of a channel raster, and the channel raster is a channel raster used in the communication mode corresponding to the second subcarrier mapping manner. Alternatively, the second offset value is any one of +(Raster2−Raster1), −(Raster2−Raster1), +Raster1, or −Raster1, where Raster1 is a value of a first channel raster, Raster2 is a value of a second channel raster, the first channel raster is a channel raster used in the communication mode corresponding to the first subcarrier mapping manner, and the second channel raster is a channel raster used in the communication mode corresponding to the second subcarrier mapping manner. Optionally, a value of the second offset value is any element of a set {0, −10, 10, −20, 20, −30, 30, −40, 40, −50, 50, −60, 60, −70, 70, −80, 80, −90, 90}.

In a possible design, the first offset value indicated by the information about the first offset value meets any one of the following formulas: X−floor(X/Raster+0.5)*Raster+7.5 KHz, X−floor(X/Raster+0.5)*Raster−7.5 KHz, X−floor(X/Raster)*Raster+7.5 KHz, or X−floor(X/Raster)*Raster−7.5 KHz, where floor( ) means rounding down, X is an integer multiple of 100 KHz, a value of X ranges from 0 KHz to (Y−100) KHz, Y is a common multiple of 100 KHz and Raster, Raster is a value of a channel raster, and the channel raster is a channel raster used in the communication mode corresponding to the second subcarrier mapping manner.

In a possible design, the information about the first offset value includes any one of a first value to an eleventh value. The first value indicates that the first offset value is 0. The second value indicates that the first offset value is +7.5 KHz. The third value indicates that the first offset value is −7.5 KHz. The fourth value indicates that the first offset value is +(Raster2−Raster1)+7.5 KHz. The fifth value indicates that the first offset value is +(Raster2−Raster1)−7.5 KHz. The sixth value indicates that the first offset value is −(Raster2−Raster1)+7.5 KHz. The seventh value indicates that the first offset value is −(Raster2−Raster1)−7.5 KHz. The eighth value indicates that the first offset value is +Raster1+7.5 KHz. The ninth value indicates that the first offset value is +Raster1−7.5 KHz. The tenth value indicates that the first offset value is −Raster1+7.5 KHz. The eleventh value indicates that the first offset value is −Raster1−7.5 KHz.

In a possible design, the first carrier is a downlink carrier shared by a first communication mode and a second communication mode. A subcarrier mapping manner corresponding to the first communication mode is the first subcarrier mapping manner, and a subcarrier mapping manner corresponding to the second communication mode is the second subcarrier mapping manner.

According to a second aspect, an embodiment of this application provides a subcarrier determining method. The method includes receiving, by a terminal, indication information from a base station, where the indication information carries information about a first offset value, the first offset value is frequency offset of subcarriers corresponding to a first subcarrier mapping manner relative to subcarriers corresponding to a second subcarrier mapping manner, and the subcarriers corresponding to the second subcarrier mapping manner are symmetric with respect to a carrier center frequency of a first carrier, and include no subcarrier on the carrier center frequency of the first carrier. The method also includes determining, by the terminal, a frequency location of one or more subcarriers of the first carrier based on the indication information, the second subcarrier mapping manner, and the carrier center frequency of the first carrier. The terminal may obtain, by receiving the indication information, an actual frequency location for mapping the subcarrier corresponding to the second subcarrier mapping manner. In this way, the terminal can perform frequency synchronization more accurately, thereby avoiding a transmission failure resulting from a frequency sampling failure that is caused by different subcarrier mapping frequency values determined by the terminal and the base station. The first subcarrier mapping manner is a subcarrier mapping manner of LTE, and the second subcarrier mapping manner is a subcarrier mapping manner of NR.

Further, the indication information further includes an evolved universal terrestrial radio access absolute radio frequency channel number (EARFCN) of the first carrier, and the terminal may obtain the carrier center frequency of the first carrier based on the EARFCN.

The terminal may obtain the indication information by receiving a system message or RRC signaling.

In a possible design, the information about the first offset value includes a first value or a second value. The first value indicates that the first offset value is 0. The second value indicates that the first offset value is +7.5 KHz, or the second value indicates that the first offset value is −7.5 KHz. Further, the indication information further carries information about a second offset value. The second offset value indicated by the information about the second offset value meets a formula X−floor(X/Raster+0.5)*Raster, or meets a formula X−floor(X/Raster)*Raster, where floor( ) means rounding down, X is an integer multiple of 100 KHz, a value of X ranges from 0 KHz to (Y−100) KHz, Y is a common multiple of 100 KHz and Raster, Raster is a value of a channel raster, and the channel raster is a channel raster used in a communication mode corresponding to the second subcarrier mapping manner. Alternatively, the second offset value is any one of +(Raster2−Raster1), −(Raster2−Raster1), +Raster1, or −Raster1, where Raster1 is a value of a first channel raster, Raster2 is a value of a second channel raster, the first channel raster is a channel raster used in a communication mode corresponding to the first subcarrier mapping manner, and the second channel raster is a channel raster used in a communication mode corresponding to the second subcarrier mapping manner. Optionally, a value of the second offset value is any element of a set {0, −10, 10, −20, 20, −30, 30, −40, 40, −50, 50, −60, 60, −70, 70, −80, 80, −90, 90}.

In a possible design, the terminal obtains the carrier center frequency of the first carrier based on the second offset value and a first frequency. The carrier center frequency is a sum of the first frequency and the second offset value, and the first frequency is obtained by the terminal based on an EARFCN.

In a possible design, the first offset value indicated by the information about the first offset value meets any one of the following formulas: X−floor(X/Raster+0.5)*Raster+7.5 KHz, X−floor(X/Raster+0.5)*Raster−7.5 KHz, X−floor(X/Raster)*Raster+7.5 KHz, or X−floor(X/Raster)*Raster−7.5 KHz, where floor( ) means rounding down, X is an integer multiple of 100 KHz, a value of X ranges from 0 KHz to (Y−100) KHz, Y is a common multiple of 100 KHz and Raster, Raster is a value of a channel raster, and the channel raster is a channel raster used in a communication mode corresponding to the second subcarrier mapping manner.

In a possible design, the information about the first offset value includes any one of a first value to an eleventh value. The first value indicates that the first offset value is 0. The second value indicates that the first offset value is +7.5 KHz. The third value indicates that the first offset value is −7.5 KHz. The fourth value indicates that the first offset value is +(Raster2−Raster1)+7.5 KHz. The fifth value indicates that the first offset value is +(Raster2−Raster1)−7.5 KHz. The sixth value indicates that the first offset value is −(Raster2−Raster1)+7.5 KHz. The seventh value indicates that the first offset value is −(Raster2−Raster1)−7.5 KHz. The eighth value indicates that the first offset value is +Raster1+7.5 KHz. The ninth value indicates that the first offset value is +Raster1−7.5 KHz. The tenth value indicates that the first offset value is −Raster1+7.5 KHz. The eleventh value indicates that the first offset value is −Raster1−7.5 KHz.

In a possible design, the first carrier is a downlink carrier shared by a first communication mode and a second communication mode. A subcarrier mapping manner corresponding to the first communication mode is the first subcarrier mapping manner, and a subcarrier mapping manner corresponding to the second communication mode is the second subcarrier mapping manner.

According to a third aspect, an embodiment of this application provides a base station. The base station includes a processor, configured to perform subcarrier mapping on a first carrier in a first subcarrier mapping manner, where subcarriers corresponding to the first subcarrier mapping manner have frequency offset of a first offset value relative to subcarriers corresponding to a second subcarrier mapping manner, and the subcarriers corresponding to the second subcarrier mapping manner are symmetric with respect to a carrier center frequency of the first carrier, and include no subcarrier on the carrier center frequency of the first carrier. The base station also includes a transceiver, configured to send indication information to a terminal, where the indication information carries information about the first offset value. A same subcarrier mapping manner is used for the first carrier, so that inter-subcarrier interference caused by coexistence of different subcarrier mapping manners can be reduced or eliminated. When a communication mode corresponding to the first subcarrier mapping manner and a communication mode corresponding to the second subcarrier mapping manner share a carrier, the base station may perform subcarrier mapping on the shared carrier in the first subcarrier mapping manner, to reduce or eliminate inter-subcarrier interference, caused by coexistence of different subcarrier mapping manners, on a base station side. For example, when NR and LTE share a carrier, the base station adjusts a mapping manner of NR subcarriers in the shared carrier, so that the NR subcarriers are mapped in a subcarrier mapping manner of LTE, thereby avoiding interference between subcarriers of NR and LTE in the shared carrier. The base station sends the indication information to the terminal, so that the terminal can obtain an actual frequency location for NR subcarrier mapping. In this way, the terminal can perform frequency synchronization more accurately, thereby avoiding a transmission failure resulting from a frequency sampling failure that is caused by different subcarrier mapping frequency values determined by the terminal and the base station.

Further, the indication information further includes an evolved universal terrestrial radio access absolute radio frequency channel number (EARFCN) of the first carrier.

The indication information may be carried in a system message or RRC signaling for sending.

In a possible design, the information about the first offset value includes a first value or a second value. The first value indicates that the first offset value is 0. The second value indicates that the first offset value is +7.5 KHz, or the second value indicates that the first offset value is −7.5 KHz. Further, the indication information further carries information about a second offset value. The second offset value indicated by the information about the second offset value meets a formula X−floor(X/Raster+0.5)*Raster, or meets a formula X−floor(X/Raster)*Raster, where floor( ) means rounding down, X is an integer multiple of 100 KHz, a value of X ranges from 0 KHz to (Y−100) KHz, Y is a common multiple of 100 KHz and Raster, Raster is a value of a channel raster, and the channel raster is a channel raster used in the communication mode corresponding to the second subcarrier mapping manner. Alternatively, the second offset value is any one of +(Raster2−Raster1), −(Raster2−Raster1), +Raster1, or −Raster1, where Raster1 is a value of a first channel raster, Raster2 is a value of a second channel raster, the first channel raster is a channel raster used in the communication mode corresponding to the first subcarrier mapping manner, and the second channel raster is a channel raster used in the communication mode corresponding to the second subcarrier mapping manner. Optionally, a value of the second offset value is any element of a set {0, −10, 10, −20, 20, −30, 30, −40, 40, −50, 50, −60, 60, −70, 70, −80, 80, −90, 90}.

In a possible design, the first offset value indicated by the information about the first offset value meets any one of the following formulas: X−floor(X/Raster+0.5)*Raster+7.5 KHz, X−floor(X/Raster+0.5)*Raster−7.5 KHz, X−floor(X/Raster)*Raster+7.5 KHz, or X−floor(X/Raster)*Raster−7.5 KHz, where floor( ) means rounding down, X is an integer multiple of 100 KHz, a value of X ranges from 0 KHz to (Y−100) KHz, Y is a common multiple of 100 KHz and Raster, Raster is a value of a channel raster, and the channel raster is a channel raster used in the communication mode corresponding to the second subcarrier mapping manner.

In a possible design, the information about the first offset value includes any one of a first value to an eleventh value. The first value indicates that the first offset value is 0. The second value indicates that the first offset value is +7.5 KHz. The third value indicates that the first offset value is −7.5 KHz. The fourth value indicates that the first offset value is +(Raster2−Raster1)+7.5 KHz. The fifth value indicates that the first offset value is +(Raster2−Raster1)−7.5 KHz. The sixth value indicates that the first offset value is −(Raster2−Raster1)+7.5 KHz. The seventh value indicates that the first offset value is −(Raster2−Raster1)−7.5 KHz. The eighth value indicates that the first offset value is +Raster1+7.5 KHz. The ninth value indicates that the first offset value is +Raster1−7.5 KHz. The tenth value indicates that the first offset value is −Raster1+7.5 KHz. The eleventh value indicates that the first offset value is −Raster1−7.5 KHz.

In a possible design, the first carrier is a downlink carrier shared by a first communication mode and a second communication mode. A subcarrier mapping manner corresponding to the first communication mode is the first subcarrier mapping manner, and a subcarrier mapping manner corresponding to the second communication mode is the second subcarrier mapping manner.

According to a fourth aspect, an embodiment of this application provides a terminal. The terminal includes a transceiver, configured to receive indication information from a base station, where the indication information carries information about a first offset value, the first offset value is frequency offset of subcarriers corresponding to a first subcarrier mapping manner relative to subcarriers corresponding to a second subcarrier mapping manner, and the subcarriers corresponding to the second subcarrier mapping manner are symmetric with respect to a carrier center frequency of a first carrier, and include no subcarrier on the carrier center frequency of the first carrier. The terminal also includes a processor, configured to determine a frequency location of one or more subcarriers of the first carrier based on the indication information, the second subcarrier mapping manner, and the carrier center frequency of the first carrier. The terminal may obtain, by receiving the indication information, an actual frequency location for mapping the subcarrier corresponding to the second subcarrier mapping manner. In this way, the terminal can perform frequency synchronization more accurately, thereby avoiding a transmission failure resulting from a frequency sampling failure that is caused by different subcarrier mapping frequency values determined by the terminal and the base station. The first subcarrier mapping manner is a subcarrier mapping manner of LTE, and the second subcarrier mapping manner is a subcarrier mapping manner of NR.

Further, the indication information further includes an evolved universal terrestrial radio access absolute radio frequency channel number (EARFCN) of the first carrier, and the processor is further configured to obtain the carrier center frequency of the first carrier based on the EARFCN.

The terminal may obtain the indication information by receiving a system message or RRC signaling.

In a possible design, the information about the first offset value includes a first value or a second value. The first value indicates that the first offset value is 0. The second value indicates that the first offset value is +7.5 KHz, or the second value indicates that the first offset value is −7.5 KHz. Further, the indication information further carries information about a second offset value. The second offset value indicated by the information about the second offset value meets a formula X−floor(X/Raster+0.5)*Raster, or meets a formula X−floor(X/Raster)*Raster, where floor( ) means rounding down, X is an integer multiple of 100 KHz, a value of X ranges from 0 KHz to (Y−100) KHz, Y is a common multiple of 100 KHz and Raster, Raster is a value of a channel raster, and the channel raster is a channel raster used in a communication mode corresponding to the second subcarrier mapping manner. Alternatively, the second offset value is any one of +(Raster2−Raster1), −(Raster2−Raster1), +Raster1, or −Raster1, where Raster1 is a value of a first channel raster, Raster2 is a value of a second channel raster, the first channel raster is a channel raster used in a communication mode corresponding to the first subcarrier mapping manner, and the second channel raster is a channel raster used in a communication mode corresponding to the second subcarrier mapping manner. Optionally, a value of the second offset value is any element of a set {0, −10, 10, −20, 20, −30, 30, −40, 40, −50, 50, −60, 60, −70, 70, −80, 80, −90, 90}.

In a possible design, the terminal obtains the carrier center frequency of the first carrier based on the second offset value and a first frequency. The carrier center frequency is a sum of the first frequency and the second offset value, and the first frequency is obtained by the terminal based on an EARFCN.

In a possible design, the first offset value indicated by the information about the first offset value meets any one of the following formulas: X−floor(X/Raster+0.5)*Raster+7.5 KHz, X−floor(X/Raster+0.5)*Raster−7.5 KHz, X−floor(X/Raster)*Raster+7.5 KHz, or X−floor(X/Raster)*Raster−7.5 KHz, where floor( ) means rounding down, X is an integer multiple of 100 KHz, a value of X ranges from 0 KHz to (Y−100) KHz, Y is a common multiple of 100 KHz and Raster, Raster is a value of a channel raster, and the channel raster is a channel raster used in a communication mode corresponding to the second subcarrier mapping manner.

In a possible design, the information about the first offset value includes any one of a first value to an eleventh value. The first value indicates that the first offset value is 0. The second value indicates that the first offset value is +7.5 KHz. The third value indicates that the first offset value is −7.5 KHz. The fourth value indicates that the first offset value is +(Raster2−Raster1)+7.5 KHz. The fifth value indicates that the first offset value is +(Raster2−Raster1)−7.5 KHz. The sixth value indicates that the first offset value is −(Raster2−Raster1)+7.5 KHz. The seventh value indicates that the first offset value is −(Raster2−Raster1)−7.5 KHz. The eighth value indicates that the first offset value is +Raster1+7.5 KHz. The ninth value indicates that the first offset value is +Raster1−7.5 KHz. The tenth value indicates that the first offset value is −Raster1+7.5 KHz. The eleventh value indicates that the first offset value is −Raster1−7.5 KHz.

In a possible design, the first carrier is a downlink carrier shared by a first communication mode and a second communication mode. A subcarrier mapping manner corresponding to the first communication mode is the first subcarrier mapping manner, and a subcarrier mapping manner corresponding to the second communication mode is the second subcarrier mapping manner.

According to a fifth aspect, an embodiment of this application provides a method for sending carrier information. The method includes determining, by a base station, a second offset value based on a first channel raster and a second channel raster. The method also includes sending, by the base station, information about the second offset value to a terminal. A value of the second offset value is any element of a set {0, −10, 10, −20, 20, −30, 30, −40, 40, −50, 50, −60, 60, −70, 70, −80, 80, −90, 90}. Alternatively, the second offset value meets a formula X−floor(X/Raster+0.5)*Raster, or meets a formula X−floor(X/Raster)*Raster, where floor( ) means rounding down, X is an integer multiple of 100 KHz, a value of X ranges from 0 KHz to (Y−100) KHz, Y is a common multiple of 100 KHz and Raster, and Raster is a value of the second channel raster. According to the method, the terminal can obtain an actual carrier center frequency. In this way, the terminal can perform frequency synchronization more accurately, thereby avoiding a transmission failure resulting from a frequency sampling failure that is caused by different subcarrier center frequencies determined by the terminal and the base station.

Specifically, when the second channel raster is 180 KHz, the value of the second offset value is any element of a set {0, −20, 20, −40, 40, −60, 60, −80, 80}. When the second channel raster is 90 KHz, the value of the second offset value is any element of a set {0, −10, 10, −20, 20, −30, 30, −40, 40, −50, 50, −60, 60, −70, 70, −80, 80, −90, 90}. The base station further sends an EARFCN to the terminal.

In a possible design, the first channel raster is an LTE channel raster, and the second channel raster is an NR channel raster.

According to a sixth aspect, an embodiment of this application provides a method for determining a carrier center frequency. The method includes receiving, by a terminal, information about a second offset value from a base station. The method also includes obtaining, by the terminal, a carrier center frequency based on the second offset value and a first frequency, where the carrier center frequency is a sum of the first frequency and the second offset value, and the first frequency is obtained by the terminal based on an EARFCN. According to the method, the terminal can obtain an actual carrier center frequency. In this way, the terminal can perform frequency synchronization more accurately, thereby avoiding a transmission failure resulting from a frequency sampling failure that is caused by different subcarrier center frequencies determined by the terminal and the base station.

A value of the second offset value is any element of a set {0, −10, 10, −20, 20, −30, 30, −40, 40, −50, 50, −60, 60, −70, 70, −80, 80, −90, 90}.

Alternatively, the second offset value meets a formula X−floor(X/Raster+0.5)*Raster, or meets a formula X−floor (X/Raster)*Raster, where floor( ) means rounding down, X is an integer multiple of 100 KHz, a value of X ranges from 0 KHz to (Y−100) KHz, Y is a common multiple of 100 KHz and Raster, and Raster is a value of a channel raster.

Specifically, when an NR channel raster is 180 KHz, the value of the second offset value is any element of a set {0, −20, 20, −40, 40, −60, 60, −80, 80}. When an NR channel raster is 90 KHz, the value of the second offset value is any element of a set {0, −10, 10, −20, 20, −30, 30, −40, 40, −50, 50, −60, 60, −70, 70, −80, 80, −90, 90}.

According to another aspect, an embodiment of this application further provides a base station that is configured to perform the method in the fifth aspect. The base station may include a transceiver and a processor. The processor is configured to determine a second offset value based on a first channel raster and a second channel raster. The transceiver is configured to send information about the second offset value to a terminal. For more specific features in this embodiment, refer to the foregoing method. Details are not described herein again.

According to another aspect, an embodiment of this application further provides a terminal that is configured to perform the method in the sixth aspect. The terminal may include a transceiver and a processor. The transceiver is configured to receive information about a second offset value from a base station. The processor is configured to obtain a carrier center frequency based on the second offset value and a first frequency, where the carrier center frequency is a sum of the first frequency and the second offset value, and the first frequency is obtained by the terminal based on an EARFCN. For more specific features in this embodiment, refer to the foregoing method. Details are not described herein again.

According to another aspect, an embodiment of this application provides a method for receiving an uplink signal. The method includes determining, by a base station, an uplink subcarrier mapping manner, where the uplink subcarrier mapping manner includes a first mapping manner and a second mapping manner, frequency domain offset of a half subcarrier exists between uplink subcarriers and downlink subcarriers that are corresponding to the first mapping manner, uplink subcarriers and downlink subcarriers that are corresponding to the second mapping manner are aligned in frequency domain, and a downlink carrier including the downlink subcarriers is paired with an uplink carrier including the uplink subcarriers. The method also includes receiving, by the base station, an uplink signal based on the uplink subcarrier mapping manner.

When the uplink subcarrier mapping manner is the first mapping manner, the uplink signal is as follows:

$$s_l(t) = \sum_{k=-\lfloor N_{SC}/2 \rfloor}^{\lceil N_{SC}/2 \rceil - 1} a_{k^{(-)},l} \cdot e^{j2\pi(k+1/2)\Delta f(t - N_{CP,l}T_s)},$$

where $0 \leq t < (N_{CP,l}+N) \times T_s$, $k^{(-)} = k + \lfloor N_{SC}/2 \rfloor$, N is a quantity of IFFT points, $N_{SC}$ is a quantity of frequency-domain subcarriers occupied by a current uplink signal of UE, $\Delta f$ is a subcarrier spacing, $a_{k,l}$ represents a signal value of a time-frequency resource element, k represents a frequency-domain subcarrier index, l represents a time-domain symbol index, $N_{CP,l}$ represents a cyclic prefix length of a symbol l, and $T_s = 1/(\Delta f \times N)$ represents a time-domain sampling point length.

Alternatively, when the uplink subcarrier mapping manner is the second mapping manner, the uplink signal is as follows:

$$s_l(t) = \sum_{k=-\lfloor N_{SC}/2 \rfloor}^{\lceil N_{SC}/2 \rceil - 1} a_{k^{(-)},l} \cdot e^{j2\pi k \Delta f(t - N_{CP,l}T_s)},$$

where $0 \leq t < (N_{CP,l}+N) \times T_s$, $k^{(-)} = k + \lfloor N_{SC}/2 \rfloor$, N is a quantity of IFFT points, $N_{SC}$ is a quantity of frequency-domain subcarriers occupied by a current uplink signal of UE, $\Delta f$ is a subcarrier spacing, $a_{k,l}$ represents a signal value of a time-frequency resource element, k represents a frequency-domain subcarrier index, l represents a time-domain symbol index, $N_{CP,l}$ represents a cyclic prefix length of a symbol l, and $T_s = 1/(\Delta f \times N)$ represents a time-domain sampling point length.

According to another aspect, an embodiment of this application provides a method for sending an uplink signal. The method includes determining, by a terminal, an uplink subcarrier mapping manner, where the uplink subcarrier mapping manner includes a first mapping manner and a second mapping manner, frequency domain offset of a half subcarrier exists between uplink subcarriers and downlink subcarriers that are corresponding to the first mapping manner, uplink subcarriers and downlink subcarriers that are corresponding to the second mapping manner are aligned in frequency domain, and a downlink carrier including the downlink subcarriers is paired with an uplink carrier including the uplink subcarriers. The method also includes sending, by the terminal, an uplink signal based on the uplink subcarrier mapping manner.

When the uplink subcarrier mapping manner is the first mapping manner, the uplink signal is as follows:

$$s_l(t) = \sum_{k=-\lfloor N_{SC}/2 \rfloor}^{\lceil N_{SC}/2 \rceil - 1} a_{k^{(-)},l} \cdot e^{j2\pi(k+1/2)\Delta f(t - N_{CP,l}T_s)},$$

where $0 \leq t < (N_{CP,l}+N) \times T_s$, $k^{(-)} = k + \lfloor N_{SC}/2 \rfloor$, N is a quantity of IFFT points, $N_{SC}$ is a quantity of frequency-domain subcarriers occupied by a current uplink signal of UE, $\Delta f$ is a subcarrier spacing, $a_{k,l}$ represents a signal value of a time-frequency resource element, k represents a frequency-domain subcarrier index, l represents a time-domain symbol index, $N_{CP,l}$ represents a cyclic prefix length of a symbol l, and $T_s = 1/(\Delta f \times N)$ represents a time-domain sampling point length.

Alternatively, when the uplink subcarrier mapping manner is the second mapping manner, the uplink signal is as follows:

$$s_l(t) = \sum_{k=-\lfloor N_{SC}/2 \rfloor}^{\lceil N_{SC}/2 \rceil - 1} a_{k^{(-)},l} \cdot e^{j2\pi k \Delta f(t - N_{CP,l}T_s)},$$

where $0 \leq t < (N_{CP,l}+N) \times T_s$, $k^{(-)} = k + \lfloor N_{SC}/2 \rfloor$, N is a quantity of IFFT points, $N_{SC}$ is a quantity of frequency-domain subcarriers occupied by a current uplink signal of UE, $\Delta f$ is a subcarrier spacing, $a_{k,l}$ represents a signal value of a time-frequency resource element, k represents a frequency-domain subcarrier index, l represents a time-domain symbol index, $N_{CP,l}$ represents a cyclic prefix length of a symbol l, and $T_s = 1/(\Delta f \times N)$ represents a time-domain sampling point length.

According to another aspect, an embodiment of this application provides a base station. The base station includes a determining module, configured to determine an uplink subcarrier mapping manner, where the uplink subcarrier mapping manner includes a first mapping manner and a second mapping manner, frequency domain offset of a half subcarrier exists between uplink subcarriers and downlink subcarriers that are corresponding to the first mapping manner, uplink subcarriers and downlink subcarriers that are corresponding to the second mapping manner are aligned in frequency domain, and a downlink carrier including the downlink subcarriers is paired with an uplink carrier including the uplink subcarriers. The base station also includes a receiving module, configured to receive an uplink signal based on the uplink subcarrier mapping manner.

According to another aspect, an embodiment of this application provides a terminal. The terminal includes a determining module, configured to determine an uplink subcarrier mapping manner, where the uplink subcarrier mapping manner includes a first mapping manner and a second mapping manner, frequency domain offset of a half subcarrier exists between uplink subcarriers and downlink subcarriers that are corresponding to the first mapping manner, uplink subcarriers and downlink subcarriers that are corresponding to the second mapping manner are aligned in frequency domain, and a downlink carrier including the downlink subcarriers is paired with an uplink carrier including the uplink subcarriers. The terminal also includes a sending module, configured to send an uplink signal based on the uplink subcarrier mapping manner.

According to still another aspect, an embodiment of this application provides a computer storage medium, configured to store a computer software instruction used by the foregoing network device or UE, where the computer software instruction includes a program designed to perform the foregoing methods.

BRIEF DESCRIPTION OF THE DRAWINGS

The following briefly describes the accompanying drawings required for describing the embodiments. Apparently, the accompanying drawings in the following description show merely some embodiments of this application, and a person of ordinary skill in the art may derive other drawings from these accompanying drawings without creative efforts.

DETAILED DESCRIPTION OF ILLUSTRATIVE EMBODIMENTS

The following describes the technical solutions in the embodiments of this application with reference to the accompanying drawings in the embodiments of this application. Apparently, the described embodiments are merely some but not all of the embodiments of this application. All other embodiments obtained by a person of ordinary skill in the art based on the embodiments of this application without creative efforts shall fall within the protection scope of this application.

It should be understood that, a base station in the embodiments of this application is an apparatus that is deployed in a radio access network and that is configured to provide a wireless communication function for a terminal. The base station may include a macro base station, a micro base station (also referred to as a small cell), a relay node, an access point, and the like in various forms. In systems that use different radio access technologies, a device that has a base station function may have different names. For example, the device is referred to as an evolved NodeB (eNB or eNodeB) in an LTE system, or is referred to as a NodeB in a 3rd generation (3G) system, or is referred to as a gNB in a future new radio (NR) network. For ease of description, in all the embodiments of this application, the foregoing apparatuses that provide a wireless communication function for the terminal are collectively referred to as base stations. The terminal in the embodiments of this application may be user equipment, and specifically includes but is not limited to a mobile station (MS), a mobile terminal, a mobile phone, a handset, portable equipment, a handheld device with a wireless communication function, a computing device or another processing device connected to a wireless modem, an in-vehicle device, a wearable device, a terminal device in an NR network, or the like.

Figure 1:
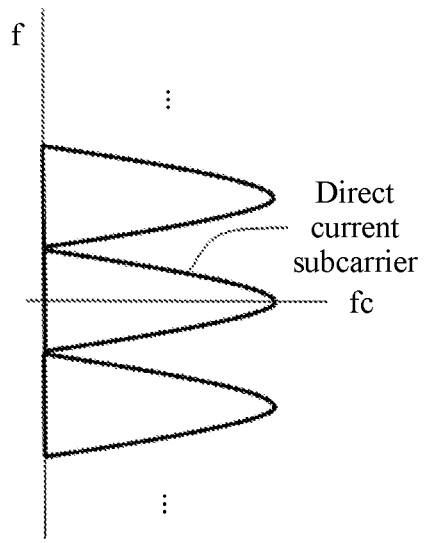
FIG. 1 is a schematic diagram of subcarrier mapping on an LTE downlink carrier.
Figure 2:
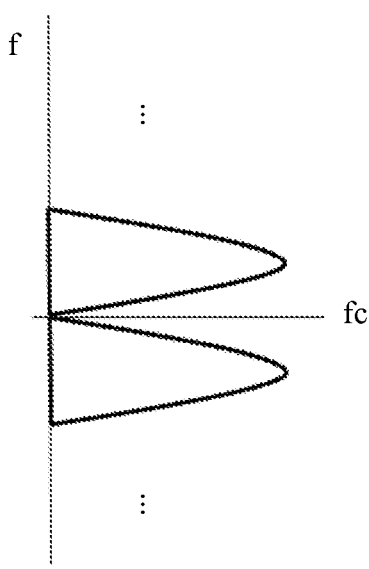
FIG. 2 is a schematic diagram of subcarrier mapping on an LTE uplink carrier.

When subcarrier mapping is performed on an LTE downlink carrier, a direct current subcarrier is reserved, and the direct current subcarrier is located at a center frequency of the downlink carrier. FIG. 1 is a schematic diagram of subcarrier mapping on an LTE downlink carrier. As shown in FIG. 1, fc represents the center frequency of the downlink carrier, and the direct current subcarrier is located at fc. When subcarrier mapping is performed on an LTE uplink carrier, uplink subcarriers are symmetric with respect to a center frequency of the uplink carrier. FIG. 2 is a schematic diagram of subcarrier mapping on an LTE uplink carrier. As shown in FIG. 2, fc represents the center frequency of the uplink carrier, and the uplink subcarriers are symmetric with respect to fc.

No direct current subcarrier is reserved during downlink subcarrier mapping and uplink subcarrier mapping of NR, and an uplink subcarrier mapping manner and a downlink subcarrier mapping manner of NR are the same. Specifically, the subcarrier mapping manner shown in FIG. 2 may be used for NR.

Figure 3:
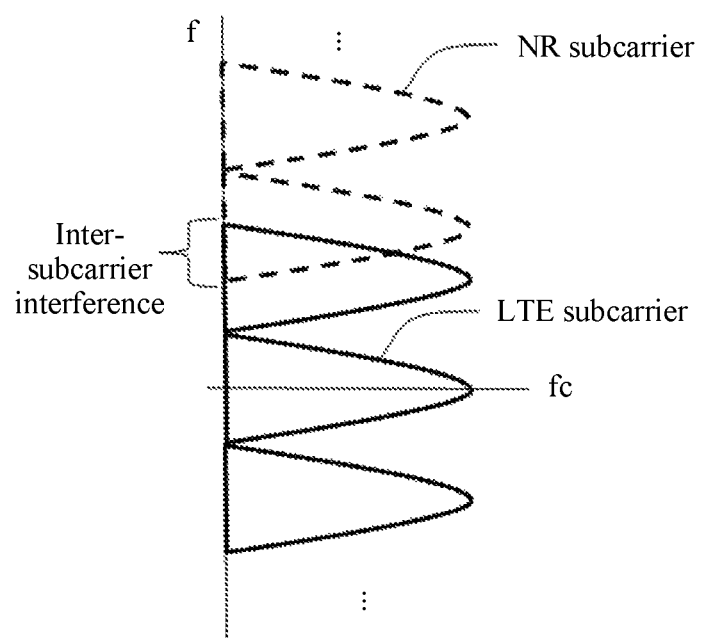
FIG. 3 is a schematic diagram of inter-subcarrier interference existing when NR and LTE share a downlink carrier.

For the case in which the subcarrier mapping manner in FIG. 2 is used for NR, when NR and LTE share a downlink carrier, the downlink subcarrier mapping manner of NR is shown in FIG. 2, and the downlink subcarrier mapping manner of LTE is shown in FIG. 1. FIG. 3 is a schematic diagram of inter-subcarrier interference existing when NR and LTE share a downlink carrier. When LTE and NR share a same downlink carrier through frequency division multiplexing (FDM), because NR and LTE have different downlink subcarrier mapping manners, inter-subcarrier interference shown in FIG. 3 occurs when NR and LTE have a same subcarrier spacing. In FIG. 3, a dashed line represents an NR subcarrier, and a solid line represents an LTE subcarrier.

In the LTE system, communication is performed only on a specially allocated carrier. According to LTE technology standards, a carrier center frequency needs to be an integer multiple of 100 KHz, that is, the carrier center frequency needs to meet a channel raster rule, that is, the carrier center frequency is an integer multiple of a value of a channel raster. Specifically, a center frequency of an uplink carrier and a center frequency of a downlink carrier each are identified by an evolved universal terrestrial radio access (E-UTRA) absolute radio frequency channel number (EARFCN). When performing initial cell access, a terminal performs search on a carrier frequency that is an integer multiple of 100 KHz. Once the terminal finds a cell available for communication, the terminal attempts to camp on the cell, obtains a center frequency of a downlink carrier of the cell based on a found channel raster result, and reads a broadcast message sent by a base station of the cell. The broadcast message includes an uplink EARFCN of the cell. The terminal may obtain a center frequency of an uplink carrier of the cell based on the EARFCN, and then initiate random access on the center frequency of the uplink carrier, to establish a connection to the base station. A carrier center frequency may be considered as a center frequency of a carrier, and in some cases, the carrier center frequency is also briefly referred to as a carrier frequency.

In a future communications system, NR and LTE may coexist by sharing a carrier. Therefore, when the shared carrier is an LTE carrier, limitations of subcarrier mapping and the channel raster of LTE need to be considered.

The embodiments of this application provide a method, to reduce or eliminate inter-subcarrier interference caused by subcarrier mapping or a channel raster. The following describes the method in detail.

In the future communications system, NR and LTE share a carrier mainly in the following scenarios.

Figure 4:
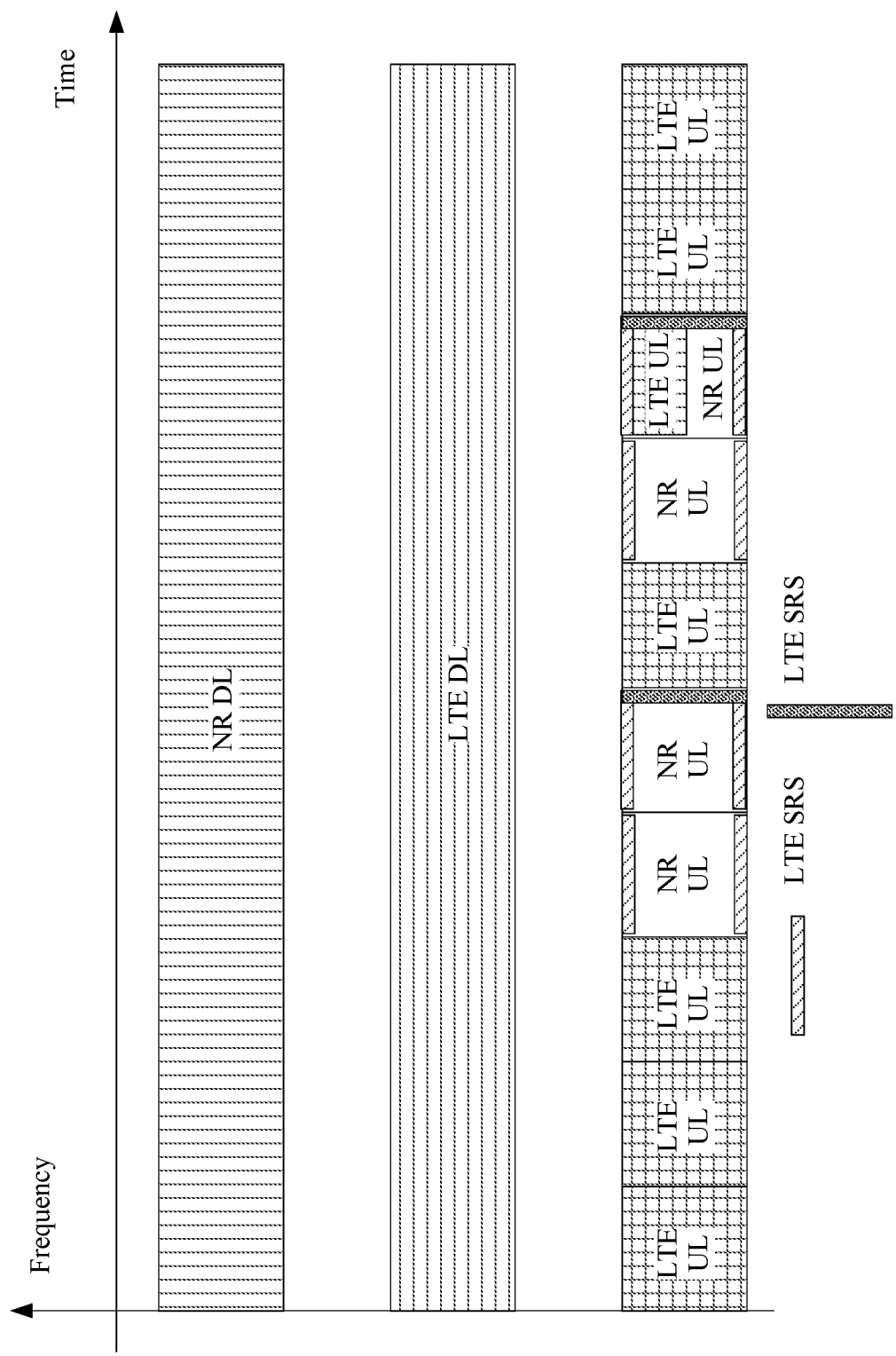
FIG. 4 is a schematic diagram of sharing an uplink carrier by NR and LTE.

Scenario 1: NR and LTE share an uplink carrier. FIG. 4 is a schematic diagram of sharing an uplink carrier by NR and LTE. As shown in FIG. 4, a dedicated carrier of NR is a downlink carrier. Further, transmission on the dedicated carrier of NR may be in a time division duplex (TDD) manner. NR and LTE share an LTE uplink carrier. Further, transmission on the shared uplink carrier may be in a frequency division duplex (FDD) manner. NR and LTE share the LTE uplink carrier in some subframes or slots through time division multiplexing (TDM), for example, in a slot 4/5/7 or a subframe 4/5/7 in FIG. 4. NR and LTE share the LTE uplink carrier in some subframes or slots through frequency division multiplexing (FDM), for example, in a slot 8 or a subframe 8 in FIG. 4. An SRS is a sounding reference signal (SRS).

Figure 5:
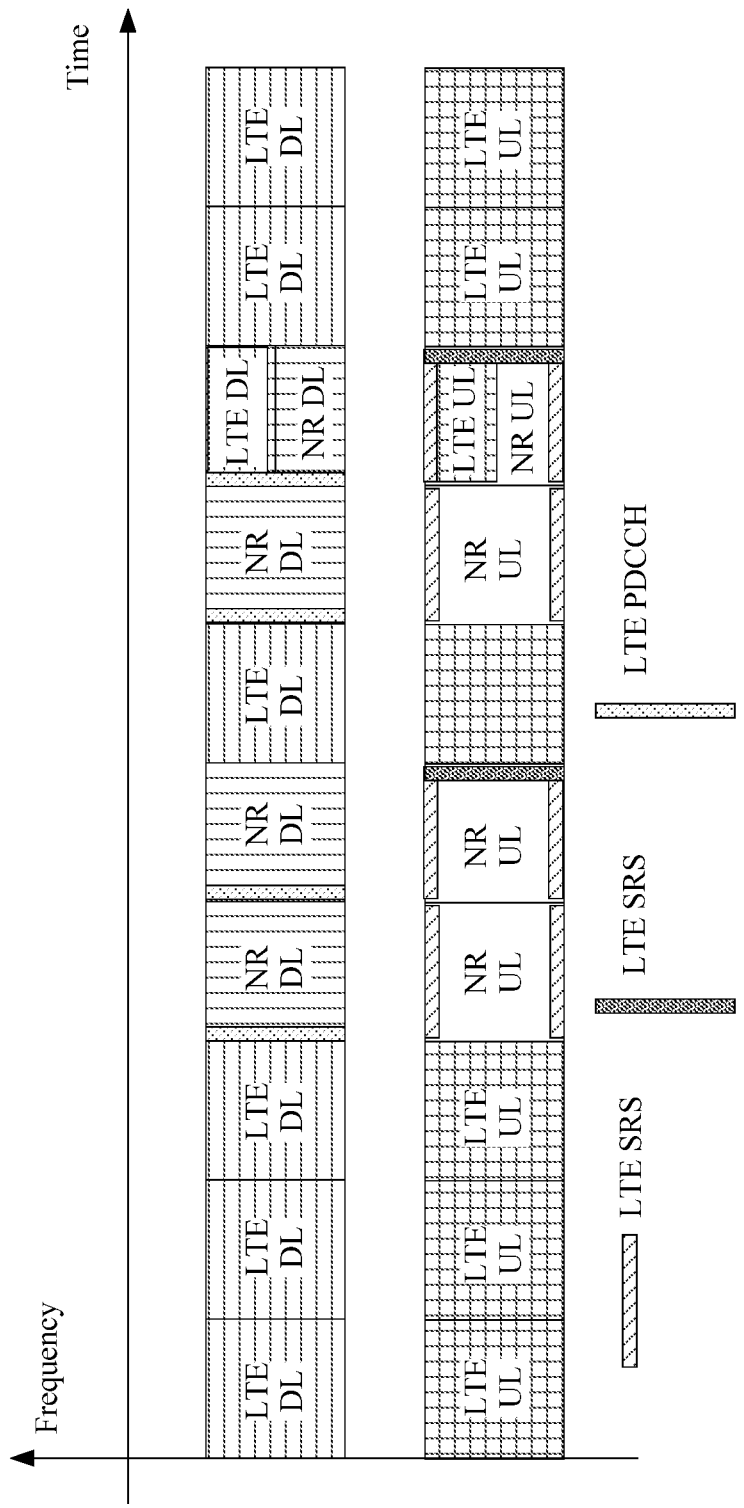
FIG. 5 is a schematic diagram of sharing an uplink carrier and a downlink carrier by NR and LTE.

Scenario 2: NR and LTE share a downlink carrier and an uplink carrier. FIG. 5 is a schematic diagram of sharing an uplink carrier and a downlink carrier by NR and LTE. NR and LTE share an LTE downlink carrier and an LTE uplink carrier. NR and LTE may share the LTE carrier through FDM or TDM. In FIG. 5, on the downlink carrier, NR occupies a slot 4/5/7 or a subframe 4/5/7, and a sharing manner is TDM. NR and LTE share the LTE downlink carrier in some subframes or slots, for example, in a slot 8 or a subframe 8 in FIG. 5, and the sharing manner is FDM. In addition, in FIG. 5, NR has no dedicated carrier different from the LTE carrier. Alternatively, a dedicated carrier different from the LTE carrier may be allocated to NR. A PDCCH is a physical downlink control channel (PDCCH).

It should be noted that, a quantity of slots or subframes and a location of the slot or subframe are only an example, and the quantity of slots and the location of the slot may be changed based on an actual requirement. In addition, there is also a case in which NR and LTE share only a downlink carrier. For a specific sharing manner, refer to FIG. 4 or FIG. 5. Details are not described herein again.

However, when NR and LTE share a carrier, interference between NR subcarriers and LTE subcarriers due to different subcarrier mapping manners needs to be considered. For example, a direct current subcarrier is reserved for an LTE downlink carrier, and no subcarrier is reserved for an LTE uplink carrier on a carrier center frequency of the first carrier. No subcarrier is reserved for an NR uplink carrier and an NR downlink carrier on a carrier center frequency of the first carrier. When NR and LTE share a downlink carrier, inter-subcarrier interference is caused because NR and LTE have different subcarrier mapping manners or there is offset of a half subcarrier between frequency locations for NR subcarrier mapping and LTE subcarrier mapping, for example, the inter-subcarrier interference shown in FIG. 3. Similarly, if NR and LTE share an uplink carrier, a similar problem may also exist.

Therefore, to reduce inter-subcarrier interference caused by different subcarrier mapping manners, NR may have a same subcarrier mapping manner as LTE (for example, when a downlink carrier is shared, the subcarrier mapping manner in FIG. 1 is used for both NR and LTE) on a shared carrier. From another perspective, it may also be considered that when the NR subcarriers are mapped in the manner in FIG. 1 (or FIG. 2), an obtained result has offset of a half subcarrier relative to a result obtained when subcarrier mapping is performed in the manner in FIG. 2 (or FIG. 1). However, there is frequency offset when the terminal still performs processing in an original mapping manner of NR. Therefore, the base station needs to notify the terminal of related information, so that the terminal can obtain, based on the related information, an actual frequency location for subcarrier mapping.

Figure 6:
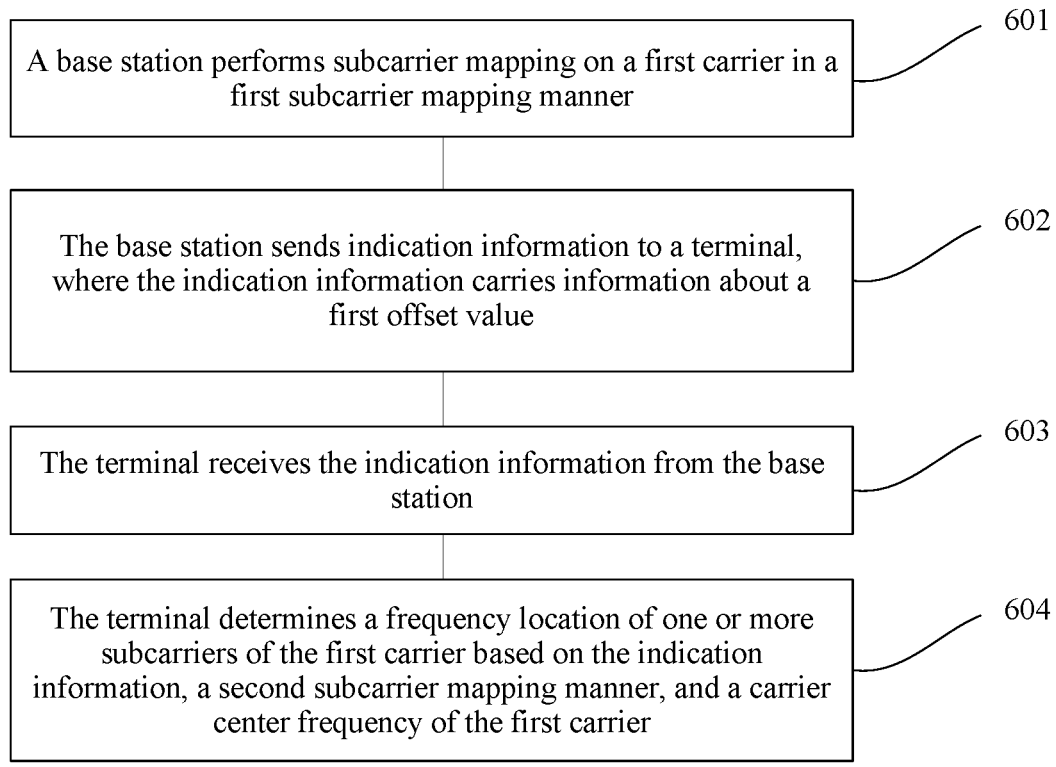
FIG. 6 is a schematic flowchart of a communication method according to an embodiment of this application.

FIG. 6 is a schematic flowchart of a communication method according to an embodiment of this application. As shown in FIG. 6, the method includes the following steps.

Step 601: A base station performs subcarrier mapping on a first carrier in a first subcarrier mapping manner.

Subcarriers corresponding to the first subcarrier mapping manner have frequency offset of a first offset value relative to subcarriers corresponding to a second subcarrier mapping manner. Further, the subcarriers corresponding to the first subcarrier mapping manner are symmetric with respect to a carrier center frequency of the first carrier and include a direct current subcarrier, and the subcarriers corresponding to the second subcarrier mapping manner are symmetric with respect to the carrier center frequency of the first carrier, and include no subcarrier on the carrier center frequency of the first carrier. In addition, when the subcarrier corresponding to the first subcarrier mapping manner and the subcarrier corresponding to the second subcarrier mapping manner have a same frequency width, the first offset value may be a frequency width of a half subcarrier. Specifically, the first subcarrier mapping manner may be a subcarrier mapping manner of LTE, and the second subcarrier mapping manner may be a subcarrier mapping manner of NR. Alternatively, the first subcarrier mapping manner may be the subcarrier mapping manner shown in FIG. 1, and the second subcarrier mapping manner may be the subcarrier mapping manner shown in FIG. 2.

Optionally, subcarrier mapping may be similarly performed on a dedicated carrier of NR in a manner of processing a carrier shared by NR and LTE.

In an example, the first carrier is a downlink carrier shared by NR and LTE, a subcarrier mapping manner of the first carrier may be consistent with that of LTE, and a result of subcarrier mapping is shifted by a half subcarrier relative to the carrier center frequency. From another perspective, during subcarrier mapping, an actual carrier center frequency is shifted by a half subcarrier.

Step 602: The base station sends indication information to a terminal, where the indication information carries information about a first offset value.

The indication information may be carried in a system message or RRC signaling for sending. Optionally, the information about the first offset value may be one of one or more possible values. The one or more possible values are corresponding to one or more possible cases of the first offset value. For example, when the first offset value is −7.5 KHz, +7.5 KHz, or 0, the information about the first offset value may be a first value, a second value, or a third value. The first value indicates that the first offset value is −7.5 KHz, and so on. Optionally, if the information about the first offset value is the first value, it indicates that the first offset value is a half subcarrier shifted in a first direction; if the information about the first offset value is the second value, it indicates that the first offset value is a half subcarrier shifted in a second direction; or if the information about the first offset value is the third value, it indicates that there is no offset. Certainly, the information about the first offset value may not include the third value. Correspondingly, a case in which the first offset value is 0 is not included.

The base station may notify, by using the indication information, the NR terminal of the subcarrier mapping manner of the first carrier. This implementation may be applied to a case in which a downlink carrier is shared, and may also be applied to a case in which an uplink carrier is shared. Sharing a downlink carrier is used as an example, and a downlink subcarrier mapping manner of LTE is shown in FIG. 1. When the downlink carrier is shared, to avoid interference between NR subcarriers and LTE subcarriers, it needs to be ensured that the NR subcarriers and the LTE subcarriers are aligned or are not crossed in terms of frequency. Therefore, the NR subcarriers in the shared downlink carrier may be mapped in the subcarrier mapping manner (for example, the mapping manner in FIG. 1) of LTE. From another perspective, it may also be considered that, after subcarrier mapping is performed for NR on the shared downlink carrier in the subcarrier mapping manner (for example, the mapping manner in FIG. 2, where an NR subcarrier width is the same as an LTE subcarrier width) of NR, there is offset of a half subcarrier. For example, it may be learned from an LTE subcarrier spacing that a frequency offset value of the NR subcarrier may be −7.5 KHz or +7.5 KHz.

For the information that is about the first offset value and that is carried in the indication information, the indication information directly carries one or more values corresponding to the first offset value. A possible implementation may be represented by using Table 1.

TABLE 1

Indication information table

| Indication information | Meaning |
| --- | --- |
| First value (for example, 0) | There is no frequency offset for subcarrier mapping. |
| Second value (for example, 1) | There is frequency offset for subcarrier mapping relative to a carrier center frequency. Optionally, a frequency offset value is a half carrier, or frequency offset may be 7.5 KHz. |

Further, based on different offset directions, there is offset of a half subcarrier in the first direction, or offset of a half subcarrier in the second direction. Similarly, the frequency offset may be −7.5 KHz or +7.5 KHz. It should be noted that, the foregoing table is only an example, and a corresponding table may be designed for each of the shared downlink carrier and the shared uplink carrier. The indication information may also have more values. For example, when the indication information is a third value, it indicates that the frequency offset is x Hz, and x may be any real number.

For the information that is about the first offset value and that is carried in the indication information, another possible implementation may be represented by using Table 2. The indication information is corresponding to the first offset value, and the correspondence (or the table) may be agreed on by the base station and the terminal in advance, or may be separately configured in the base station and the terminal in advance.

TABLE 2

Another form of indication information

| Indication information | Meaning |
| --- | --- |
| 0 | There is frequency offset for subcarrier mapping. |
| 1 | There is frequency offset of −7.5 KHz for subcarrier mapping. |
| 2 | There is frequency offset of +7.5 KHz for subcarrier mapping. |

Optionally, the indication information may be directly a specific value of the frequency offset. For example, the indication information is −7.5 KHz, +7.5 KHz, or 0.

In a scenario in which NR has no dedicated downlink carrier, for example, in the carrier sharing scenario shown in FIG. 5, a shared carrier may be an FDD carrier (for example, NR and LTE share the carrier in the slot 8 through frequency division multiplexing in FIG. 5). The base station needs to notify the terminal of indication information of the shared carrier, so that the terminal can obtain a frequency location of an NR subcarrier based on the indication information. Specifically, the base station may notify the terminal of an EARFCN and the indication information of the shared carrier. In a possible example, a synchronization channel is located at a center location on a frequency range of the entire shared carrier, and in this case, the EARFCN does not need to be notified. The terminal may obtain a carrier center frequency by detecting the synchronization channel. Therefore, the base station may need to notify only the indication information. In a scenario in which NR has a dedicated downlink carrier, the base station may notify indication information (or related carrier information) of a shared carrier by using the dedicated downlink carrier. Further, the base station may also notify the terminal of an EARFCN of the shared carrier by using the dedicated downlink carrier. It should be noted that, the EARFCN is used to indicate a carrier center frequency, and may be replaced with another parameter that can implement the function. This is not limited in this application.

Step 603: The terminal receives the indication information from the base station.

The indication information carries the information about the first offset value, and the first offset value is frequency offset of the subcarriers corresponding to the first subcarrier mapping manner relative to the subcarriers corresponding to the second subcarrier mapping manner. Further, the subcarriers corresponding to the first subcarrier mapping manner are symmetric with respect to the carrier center frequency of the first carrier and include a direct current subcarrier, and the subcarriers corresponding to the second subcarrier mapping manner are symmetric with respect to the carrier center frequency of the first carrier, and include no subcarrier on the carrier center frequency of the first carrier. In addition, when the subcarrier corresponding to the first subcarrier mapping manner and the subcarrier corresponding to the second subcarrier mapping manner have a same frequency width, the first offset value may be a frequency width of a half subcarrier.

The terminal may obtain the indication information by receiving a system message or RRC signaling. Optionally, the information about the first offset value may be one of one or more possible values. The one or more possible values are corresponding to one or more possible cases of the first offset value. For example, when the first offset value is −7.5 KHz, +7.5 KHz, or 0, the information about the first offset value may be the first value, the second value, or the third value. The first value indicates that the first offset value is −7.5 KHz, and so on. Optionally, if the information about the first offset value is the first value, it indicates that the first offset value is a half subcarrier shifted in the first direction; if the information about the first offset value is the second value, it indicates that the first offset value is a half subcarrier shifted in the second direction; or if the information about the first offset value is the third value, it indicates that there is no offset. Certainly, the information about the first offset value may not include the third value. Correspondingly, a case in which the first offset value is 0 is not included.

Further, the terminal may receive the EARFCN from the base station.

Step 604: The terminal determines a frequency location of one or more subcarriers of the first carrier based on the indication information, a second subcarrier mapping manner, and a carrier center frequency of the first carrier.

Specifically, the terminal shifts the carrier center frequency of the first carrier based on the first offset value indicated by the indication information, to obtain an actual carrier center frequency existing when subcarrier mapping is performed in the second subcarrier mapping manner, and therefore can obtain the frequency location of the one or more subcarriers based on the actual carrier center frequency and the second subcarrier mapping manner. For example, when NR and LTE share a carrier, the terminal may determine a frequency location of an NR subcarrier based on the indication information.

In another possible implementation, after the terminal obtains the carrier center frequency of the first carrier by using the EARFCN, the terminal obtains a first frequency location of one or more subcarriers in the subcarrier mapping manner of NR, and further obtains a second frequency location of the one or more subcarriers based on the first offset value (or a frequency offset value for subcarrier mapping) indicated by the indication information. The second frequency location has frequency offset of the first offset value relative to the first frequency location.

It should be noted that, the carrier center frequency of the first carrier may be obtained by the terminal by using the EARFCN carried in a broadcast message or a dedicated message, or may be obtained by the terminal when the terminal receives a synchronization signal.

Optionally, a manner of obtaining the carrier center frequency by the terminal by using the EARFCN is as follows: A relationship between a downlink EARFCN and a downlink carrier center frequency (unit: megahertz (MHz)) is given by a formula: $F_{DL}=F_{DL\_low}+0.1(N_{DL}-N_{Offs-DL})$, where $F_{DL}$ is the downlink carrier center frequency, $N_{DL}$ is the downlink EARFCN, $F_{DL\_low}$ is a lowest frequency value in the frequency range, and $N_{Offs-DL}$ is an offset value in the frequency range. $F_{DL\_low}$ and $N_{Offs-DL}$ may be specified by a standard, for example, as shown in Table 3. For example, when the base station notifies the terminal that the downlink EARFCN (or $N_{DL}$) is 10, a value of $N_{DL}$ ranges from 0 to 599. Therefore, corresponding $F_{DL\_low}$ and $N_{Offs-DL}$ are respectively 2110 and 0, and the carrier center frequency corresponding to $N_{DL}$ that is 10 is 2111 MHz through calculation based on the formula. Similarly, a relationship between an uplink EARFCN and an uplink carrier center frequency (unit: megahertz (MHz)) is given by a formula: $F_{UL}=F_{UL\_low}+0.1(N_{UL}-N_{Offs-UL})$, where $F_{UL}$ is the uplink carrier center frequency, $N_{UL}$ is the uplink EARFCN, $F_{UL\_low}$ is a lowest frequency value in the frequency range, and $N_{Offs-UL}$ is an offset value in the frequency range.

TABLE 3

Values of $F_{DL\_low}$ and $N_{Offs-DL}$

| $F_{DL\_low}$ (unit: MHz) | $N_{Offs-DL}$ | Value range of $N_{DL}$ |
|---|---|---|
| 2110 | 0 | 0 to 599 |
| 1930 | 600 | 600 to 1199 |
| 1805 | 1200 | 1200 to 1949 |
| 2110 | 1950 | 1950 to 2399 |
| 869 | 2400 | 2400 to 2649 |
| 875 | 2650 | 2650 to 2749 |

Further, after obtaining the carrier center frequency of the first carrier by using the EARFCN, the terminal may obtain, based on the first offset value (or a frequency offset value for subcarrier mapping) carried in the indication information, the actual carrier center frequency existing when subcarrier mapping is performed on the first carrier, to obtain a frequency value for mapping the subcarrier of the first carrier.

Optionally, the terminal may directly obtain, based on the EARFCN and the first offset value (or a frequency offset value for subcarrier mapping, where the value may be represented by using $F_{offs}$) indicated by the indication information, the actual carrier center frequency existing when subcarrier mapping is performed the first carrier in the second subcarrier mapping manner, where $F_{DL}=F_{DL\_low}+0.1(N_{DL}-N_{Offs-DL})+F_{offs}$ or $F_{UL}=F_{UL\_low}+0.1(N_{UL}-N_{Offs-UL})+F_{offs}$, to obtain the frequency location of the one or more subcarriers of the first carrier.

It should be noted that, in LTE, a carrier center frequency needs to be an integer multiple of 100 KHz, that is, the carrier center frequency needs to meet a channel raster rule. A channel raster rule of NR may follow the rule of LTE, or may be different from the rule of LTE. For example, a carrier center frequency in NR may be an integer multiple of 300 KHz. That is, when NR and LTE have different channel rasters, frequency offset caused by different channel rasters further needs to be considered.

Therefore, the indication information may further carry information about a second offset value, and the second offset value is frequency offset caused by different channel rasters. In a possible implementation, the second offset value meets a formula X−floor(X/Raster_NR+0.5)*Raster_NR, or meets a formula X−floor(X/Raster_NR)*Raster_NR, where floor( ) means rounding down, X is an integer multiple of 100 KHz, a possible value of X ranges from 0 to (Y−100), Y is a common multiple of 100 KHz and Raster_NR, Raster_NR represents a value of an NR channel raster, and the second offset value is in a unit of KHz. Y may be calculated based on the value of the NR channel raster, and ranges of all optional values of X are further calculated, so that all optional values of the second offset value are obtained. When the value of the NR channel raster is 300 KHz, a value of Y is 300 KHz, and a possible value of the second offset value is 0, 100 KHz, or −100 KHz. Optionally, the value of the second offset value may be shown in Table 4. A correspondence in Table 4 may be agreed on by the base station and the terminal in advance, or may be separately configured in the base station and the terminal in advance.

TABLE 4

Value of a second offset value

| Second offset value | Meaning |
|---|---|
| 0 | 0 |
| 1 | 100 KHz |
| 2 | −100 KHz |

Optionally, when the base station separately sends the information about the first offset value and the information about the second offset value, after receiving the information about the second offset value, the terminal may perform processing in the operation manner of the first offset value in the foregoing descriptions. Details are not described herein again.

In addition, the indication information may carry information about a total offset value or carry only the information about the total offset value. The total offset value may be obtained based on the first offset value and the second offset value. For example, the total offset value is a sum of the first offset value and the second offset value. For a specific implementation of transmitting the total offset value, refer to the descriptions of the first offset value in the foregoing method. Details are not described herein again. Optionally, when the value of the NR channel raster is 300 KHz, the value of Y is 300 KHz, and the value of the total offset value is shown in Table 5 or Table 6. A correspondence in Table 5 or Table 6 may be agreed on by the base station and the terminal in advance, or may be separately configured in the base station and the terminal in advance.

TABLE 5

Value of a total offset value

| Total offset value | Meaning |
|---|---|
| 0 | 0 |
| 1 | +7.5 KHz |
| 2 | 100 KHz + 7.5 KHz |
| 3 | −100 KHz + 7.5 KHz |

TABLE 6

Value of a total offset value

| Total offset value | Meaning |
|---|---|
| 0 | 0 |
| 1 | −7.5 KHz |
| 2 | 100 KHz − 7.5 KHz |
| 3 | −100 KHz − 7.5 KHz |

Optionally, when the value of the NR channel raster is 180 KHz, the value of Y is 900 KHz, and the value of the second offset value may be shown in Table 7. A correspondence in Table 7 may be agreed on by the base station and the terminal in advance, or may be separately configured in the base station and the terminal in advance.

TABLE 7

Value of a second offset value

| Second offset value | Meaning (unit: KHz) |
|---|---|
| 0 | 0 |
| 1 | 20 |
| 2 | −20 |
| 3 | 40 |
| 4 | −40 |
| 5 | 60 |
| 6 | −60 |
| 7 | 80 |
| 8 | −80 |

Optionally, when the value of the NR channel raster is 180 KHz, the value of Y is 900 KHz, and the value of the total offset value is shown in Table 8 or Table 9. A correspondence in Table 8 or Table 9 may be agreed on by the base station and the terminal in advance, or may be separately configured in the base station and the terminal in advance.

TABLE 8

Value of a total offset value

| Total offset value | Meaning |
|---|---|
| 0 | 0 |
| 1 | +7.5 KHz |
| 2 | 20 + 7.5 KHz |
| 3 | −20 + 7.5 KHz |
| 4 | 40 + 7.5 KHz |
| 5 | −40 + 7.5 KHz |
| 6 | 60 + 7.5 KHz |
| 7 | −60 + 7.5 KHz |
| 8 | 80 + 7.5 KHz |
| 9 | −80 + 7.5 KHz |

TABLE 9

Value of a total offset value

| Total offset value | Meaning |
|---|---|
| 0 | 0 |
| 1 | −7.5 KHz |
| 2 | 20 − 7.5 KHz |
| 3 | −20 − 7.5 KHz |
| 4 | 40 − 7.5 KHz |
| 5 | −40 − 7.5 KHz |
| 6 | 60 − 7.5 KHz |
| 7 | −60 − 7.5 KHz |
| 8 | 80 − 7.5 KHz |
| 9 | −80 − 7.5 KHz |

It should be noted that, when there is no frequency offset caused by subcarrier mapping, the base station may notify the terminal of only the information about the second offset value. For example, the base station determines the second offset value based on a first channel raster and a second channel raster, and the base station sends the information about the second offset value to the terminal. The value of the second offset value is any element of a set {0, −10, 10, −20, 20, −30, 30, −40, 40, −50, 50, −60, 60, −70, 70, −80, 80, −90, 90}. Alternatively, the second offset value meets a formula X−floor(X/Raster+0.5)*Raster, or meets a formula X−floor(X/Raster)*Raster, where floor( ) means rounding down, X is an integer multiple of 100 KHz, a value of X ranges from 0 KHz to (Y−100) KHz, Y is a common multiple of 100 KHz and Raster, and Raster is a value of the second channel raster. Specifically, when the second channel raster is 180 KHz, the value of the second offset value is any element of a set {0, −20, 20, −40, 40, −60, 60, −80, 80}. When the second channel raster is 90 KHz, the value of the second offset value is any element of a set {0, −10, 10, −20, 20, −30, 30, −40, 40, −50, 50, −60, 60, −70, 70, −80, 80, −90, 90}. Any element of the foregoing set may be in a unit of KHz. In a possible design, the first channel raster is an LTE channel raster, and the second channel raster is an NR channel raster. For more specific implementation methods, refer to the implementation of the first offset value. Details are not described herein again.

When NR and LTE share a carrier, the base station adjusts a mapping manner of NR subcarriers in the shared carrier, so that the NR subcarriers are mapped in a subcarrier mapping manner of LTE, thereby avoiding interference between subcarriers of NR and LTE in the shared carrier. The base station sends the indication information to the terminal, so that the terminal can obtain an actual frequency location for NR subcarrier mapping. In this way, the terminal can perform frequency synchronization more accurately, thereby avoiding a transmission failure resulting from a frequency sampling failure that is caused by different subcarrier mapping frequency values determined by the terminal and the base station. In this embodiment of this application, inter-subcarrier interference on the shared carrier is avoided, and frequency synchronization of NR is also ensured and frequency band utilization of the shared carrier is also improved. In addition, coverage and mobility performance of NR are also improved by sharing a low frequency carrier.

In the foregoing embodiments provided in this application, a method for sending carrier information, a subcarrier determining method, and related signaling that are provided in the embodiments of this application are described from perspectives of the base station and the terminal. It may be understood that, to implement the foregoing functions, the terminal and the base station each include a corresponding hardware structure and/or software module for performing each function. A person skilled in the art should be easily aware that, units and algorithm steps in the examples described with reference to the embodiments disclosed in this specification may be implemented by hardware or a combination of hardware and computer software in this application. Whether the functions are performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 7:
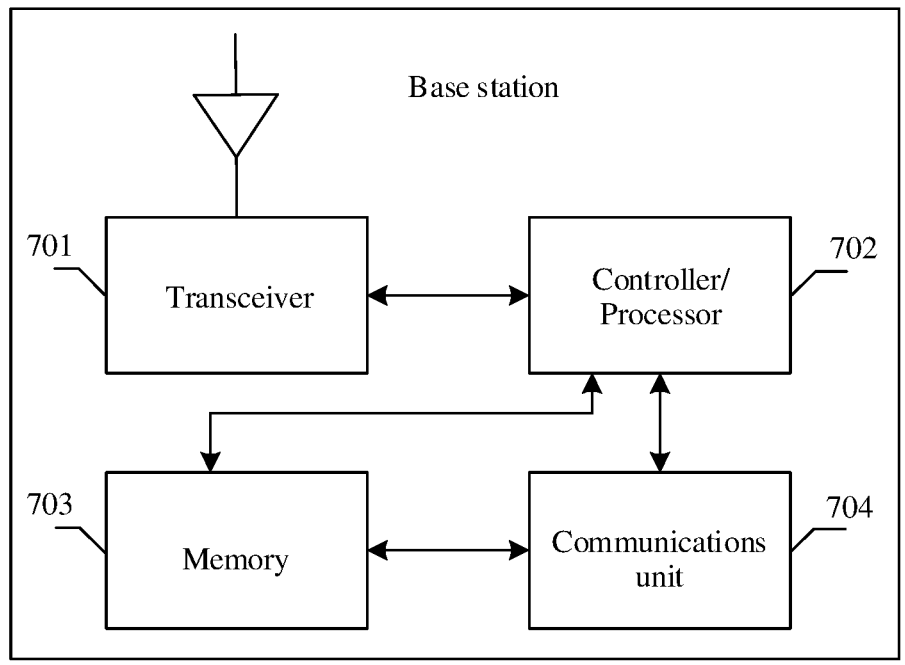
FIG. 7 is a possible schematic structural diagram of a base station according to an embodiment of this application.

FIG. 7 is a possible schematic structural diagram of a base station according to an embodiment of this application. The base station shown in FIG. 7 includes a transceiver 701 and a controller/processor 702. The transceiver 701 may be configured to: support the base station in receiving information from and sending information to the terminal in the foregoing embodiments, and support the base station in performing radio communication with another UE. The controller/processor 702 may be configured to perform various functions for communicating with the terminal or another network device. In an uplink, an uplink signal from the terminal is received by an antenna, demodulated by the transceiver 701, and further processed by the controller/processor 702, to restore service data and signaling information that are sent by the terminal. In a downlink, service data and a signaling message are processed by the controller/processor 702 and demodulated by the transceiver 701, to generate a downlink signal, and the downlink signal is transmitted by the antenna to the terminal.

Specifically, the controller/processor 702 may be configured to perform subcarrier mapping on a first carrier in a first subcarrier mapping manner, where subcarriers corresponding to the first subcarrier mapping manner have frequency offset of a first offset value relative to subcarriers corresponding to a second subcarrier mapping manner, and the subcarriers corresponding to the second subcarrier mapping manner are symmetric with respect to a carrier center frequency of the first carrier, and include no subcarrier on the carrier center frequency of the first carrier. The transceiver 701 may be configured to send indication information to a terminal, where the indication information carries information about the first offset value.

In an example, the first offset value indicated by the information about the first offset value meets any one of the following formulas: X−floor(X/Raster+0.5)*Raster+7.5 KHz, X−floor(X/Raster+0.5)*Raster−7.5 KHz, X−floor(X/Raster)*Raster+7.5 KHz, or X−floor(X/Raster)*Raster−7.5 KHz, where floor( ) means rounding down, X is an integer multiple of 100 KHz, a value of X ranges from 0 KHz to (Y−100) KHz, Y is a common multiple of 100 KHz and Raster, Raster is a value of a channel raster, and the channel raster is a channel raster used in a communication mode corresponding to the second subcarrier mapping manner.

In another example, the first carrier is a downlink carrier shared by a first communication mode and a second communication mode; a subcarrier mapping manner corresponding to the first communication mode is the first subcarrier mapping manner; and a subcarrier mapping manner corresponding to the second communication mode is the second subcarrier mapping manner.

It should be understood that, for related details about features such as the subcarrier mapping manner, the indication information, and the first offset value in this embodiment, refer to the foregoing method embodiments. Details are not described herein again.

It may be understood that FIG. 7 shows only a simplified design of the base station. In actual application, the base station may include any quantity of transmitters, receivers, processors, controllers, memories, communications units, and the like, and all base stations that can implement this application fall within the protection scope of this application.

Figure 8:
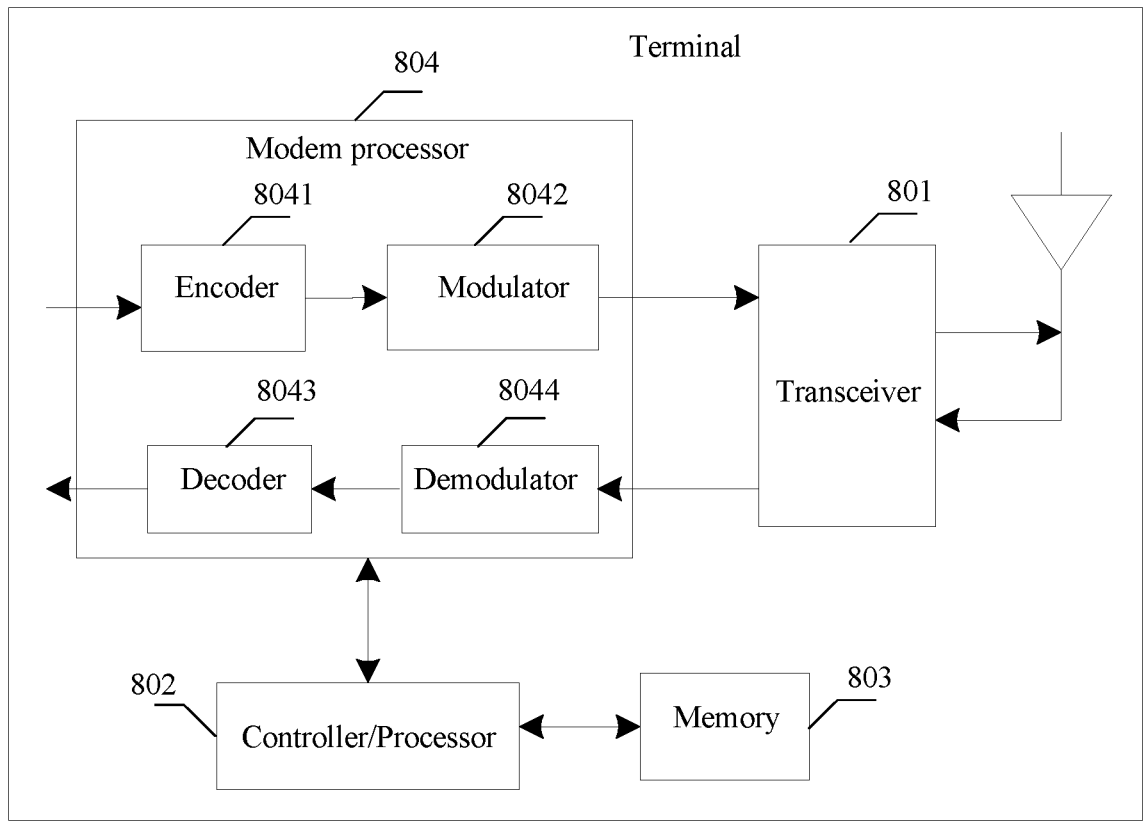
FIG. 8 is a simplified schematic diagram of a possible design structure of a terminal according to an embodiment of this application.

FIG. 8 is a simplified schematic diagram of a possible design structure of a terminal according to an embodiment of this application. The terminal may be one of the terminals mentioned above. The terminal includes a transceiver 801 and a controller/processor 802, and may further include a memory 803 and a modem processor 804.

The transceiver 801 adjusts (for example, performs analog-conversion, filtering, amplification, and up-conversion on) an output sample and generates an uplink signal. The uplink signal is transmitted by an antenna to the base station in the foregoing embodiments. In a downlink, the antenna receives a downlink signal transmitted by the base station in the foregoing embodiments. The transceiver 801 adjusts (for example, performs filtering, amplification, down-conversion, and digitization on) the signal received from the antenna and provides an input sample. In the modem processor 804, an encoder 8041 receives service data and a signaling message that are to be sent in an uplink, and processes (for example, formats, encodes, and interleaves)

the service data and the signaling message. A modulator 8042 further processes (for example, performs symbol mapping and modulation on) the encoded service data and the encoded signaling message, and provides an output sample. A demodulator 8044 processes (for example, demodulates) the input sample and provides symbol estimation. A decoder 8043 processes (for example, de-interleaves and decodes) the symbol estimation and provides the decoded data and the decoded signaling message that are to be sent to the terminal. The encoder 8041, the modulator 8042, the demodulator 8044, and the decoder 8043 may be implemented by the composite modem processor 804. These units perform processing based on a radio access technology (such as an access technology in LTE and another evolved system) used in a radio access network.

The transceiver 801 may be configured to receive indication information from a base station, where the indication information carries information about a first offset value, the first offset value is frequency offset of subcarriers corresponding to a first subcarrier mapping manner relative to subcarriers corresponding to a second subcarrier mapping manner, and the subcarriers corresponding to the second subcarrier mapping manner are symmetric with respect to a carrier center frequency of a first carrier, and include no subcarrier on the carrier center frequency of the first carrier.

The controller/processor 802 may be configured to determine a frequency location of one or more subcarriers of the first carrier based on the indication information, the second subcarrier mapping manner, and the carrier center frequency of the first carrier.

In an example, the information about the first offset value includes a first value or a second value; the first value indicates that the first offset value is 0; and the second value indicates that the first offset value is +7.5 KHz, or the second value indicates that the first offset value is −7.5 KHz. Further, the indication information further carries information about a second offset value, and the second offset value indicated by the information about the second offset value is X−floor(X/Raster+0.5)*Raster or X−floor(X/Raster)*Raster, where floor( ) means rounding down, X is an integer multiple of 100 KHz, a value of X ranges from 0 KHz to (Y−100) KHz, Y is a common multiple of 100 KHz and Raster, Raster is a value of a channel raster, and the channel raster is a channel raster used in a communication mode corresponding to the second subcarrier mapping manner.

In another example, the first carrier is a downlink carrier shared by a first communication mode and a second communication mode; a subcarrier mapping manner corresponding to the first communication mode is the first subcarrier mapping manner; and a subcarrier mapping manner corresponding to the second communication mode is the second subcarrier mapping manner.

It should be understood that, for related details about features such as the subcarrier mapping manner, the indication information, and the first offset value in this embodiment, refer to the foregoing method embodiments. Details are not described herein again.

The controller/processor configured to perform the terminal or the base station in this application may be a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. The controller/processor may implement or execute various example logical blocks, modules, and circuits described with reference to content disclosed in this application. Alternatively, the processor may be a combination implementing a computing function, for example, a combination of one or more microprocessors or a combination of a DSP and a microprocessor.

It should be understood that, the processor in this embodiment of this application may be implemented by a processing module, and the transceiver may be implemented by a transceiver module.

An embodiment of this application further provides a communications system, and the communications system includes the base station shown in FIG. 7 and the terminal shown in FIG. 8.

Figure 9:
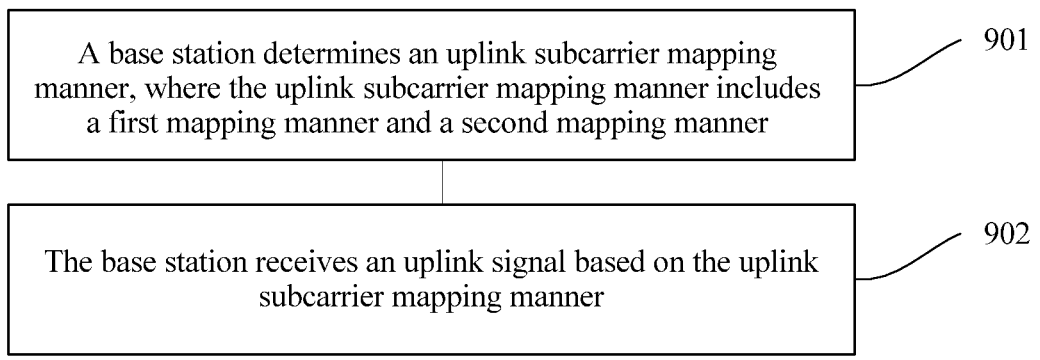
FIG. 9 is a schematic flowchart of a method for receiving an uplink signal.

FIG. 9 is a schematic flowchart of a method for receiving an uplink signal. As shown in FIG. 9, an embodiment of this application further provides a method for receiving an uplink signal, and the method includes the following steps.

Step 901: A base station determines an uplink subcarrier mapping manner, where the uplink subcarrier mapping manner includes a first mapping manner and a second mapping manner.

Frequency domain offset of a half subcarrier exists between uplink subcarriers and downlink subcarriers that are corresponding to the first mapping manner, and a downlink carrier including the downlink subcarriers is paired with an uplink carrier including the uplink subcarriers. Specifically, the uplink carrier is paired with the downlink carrier in a case of frequency division or initial cell access.

Figure 10:
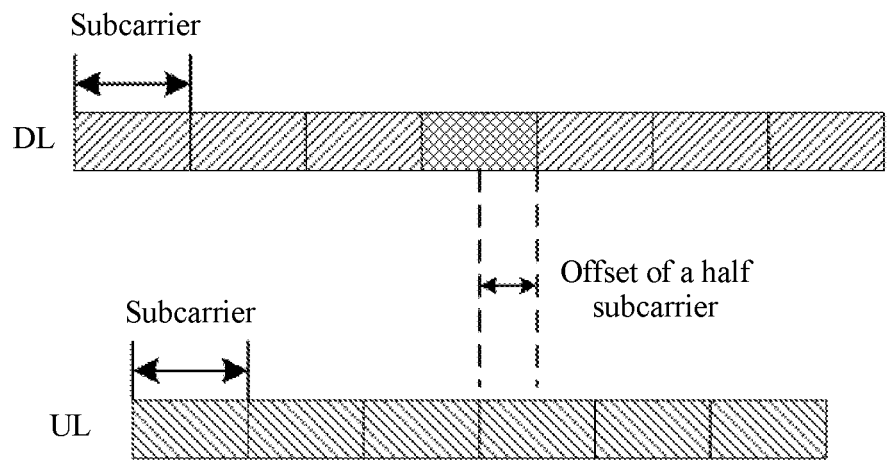
FIG. 10 is a schematic diagram of a first mapping manner.

FIG. 10 is a schematic diagram of a first mapping manner. As shown in FIG. 10, no subcarrier in a UL carrier is aligned with a subcarrier in a DL carrier. It may be considered that offset of a half subcarrier exists between the UL subcarrier and the DL subcarrier. The first mapping manner may be applied to a scenario in which NR and LTE share an LTE uplink carrier. In this case, in FIG. 10, DL may be an LTE downlink carrier and UL may be an NR uplink carrier. For example, there is a pair of LTE FDD uplink and downlink carriers on a low frequency band (for example, a frequency range of 800 MHz), and an NR downlink carrier or an NR TDD system is deployed on a high frequency band (for example, a frequency range of 3.5 GHz or even dozens of GHz). Because an NR base station may use a beamforming technology of a massive antenna array on the high frequency band to reduce a path loss caused by a high frequency, so as to enhance downlink coverage. However, a terminal generally uses an omnidirectional antenna due to a size limitation. In this case, there is a coverage problem on the high frequency band during uplink sending of the terminal. Therefore, the NR downlink carrier deployed on the high frequency band and the LTE uplink carrier on the low frequency band may jointly operate to serve an NR terminal. In this case, this is equivalent to that NR and LTE share the LTE uplink carrier. In other words, uplink transmission of NR is performed by using the LTE uplink carrier (or a part of the uplink carrier).

In a scenario in which NR and LTE share the LTE uplink carrier, subcarriers of NR and LTE need to be aligned, so as to implement resource coordination and resource multiplexing between the two systems, and interference between adjacent subcarriers is avoided or reduced. An uplink subcarrier division manner of LTE has frequency offset of a half subcarrier in comparison to a subcarrier division manner for an absolute frequency or a downlink subcarrier division manner of LTE. Therefore, an uplink subcarrier mapping manner of NR also needs to be consistent with an uplink subcarrier mapping manner of LTE. Alternatively, compared with the subcarrier division manner on the absolute frequency or the downlink subcarrier division manner of LTE, the NR uplink subcarrier needs to have frequency offset of a half subcarrier.

Uplink subcarriers and downlink subcarriers that are corresponding to the second mapping manner are aligned in frequency domain, and a downlink carrier including the downlink subcarriers is paired with an uplink carrier including the uplink subcarriers. Specifically, the uplink carrier is paired with the downlink carrier in a case of frequency division or initial cell access.

Figure 11:
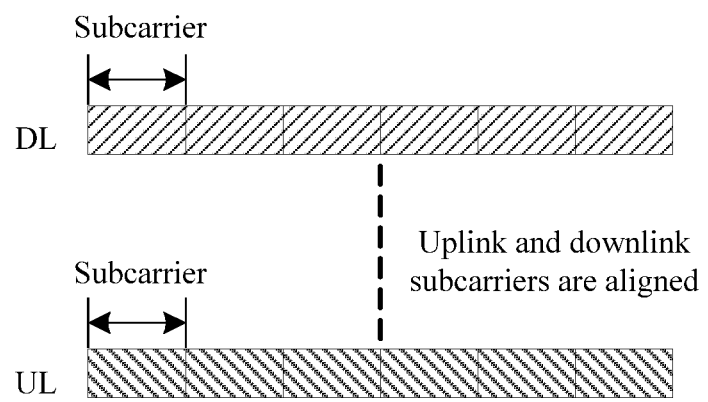
FIG. 11 is a schematic diagram of a second mapping manner.

FIG. 11 is a schematic diagram of a second mapping manner. As shown in FIG. 11, subcarriers in a UL carrier are aligned with subcarriers in a DL carrier. It may be considered that no subcarrier offset exists between the UL subcarrier and the DL subcarrier. The second mapping manner may be applied to a scenario in which NR and LTE do not share an LTE uplink carrier, namely, a scenario in which NR independently operates, or may be applied to a scenario in which a flexible duplex technology is used in an NR system. In this case, in FIG. 11, DL may be an NR downlink carrier and UL may be an NR uplink carrier. Flexible duplex means that an uplink signal can be sent in some subframes on an NR FDD downlink carrier and a downlink signal can be sent in some subframes on an NR FDD uplink carrier. In this case, downlink sending interferes with uplink receiving in adjacent base stations or adjacent cells. A current solution includes interference coordination or interference cancellation. Regardless of which solution, uplink and downlink subcarriers need to be aligned. In addition, compared with a case in which primary deployment in LTE is a subcarrier spacing of 15 KHz, NR needs to support deployment of a plurality of types of subcarrier spacings. For example, a subcarrier spacing of 15 KHz is used to support a mobile broadband service, and a subcarrier spacing of 60 KHz is used to support an ultra-reliable and low latency service. An uplink subcarrier mapping manner of NR needs to be consistent with a subcarrier division manner for an absolute frequency or consistent with a downlink subcarrier mapping manner of NR. An advantage is that offset of different frequency values is not required for different subcarrier spacings. For example, offset of a half subcarrier 7.5 KHz is required for a subcarrier spacing of 15 KHz; offset of a half subcarrier 15 KHz is required for a subcarrier spacing of 30 KHz; and offset of a half subcarrier 30 KHz is required for a subcarrier spacing of 60 KHz.

Further, when determining the uplink subcarrier mapping manner, the base station may determine the uplink subcarrier mapping manner based on a predefined uplink subcarrier mapping manner in a standard, or may determine the uplink subcarrier mapping manner based on an internal algorithm. For example, the base station determines the uplink subcarrier mapping manner based on a correspondence between a frequency band and the uplink subcarrier mapping manner. In an implementation, a low frequency band (for example, a frequency range of 800 MHz) is corresponding to the first mapping manner, and a high frequency band (for example, a frequency range of 3.5 GHz) is corresponding to the second mapping manner. In this case, the base station may determine the uplink subcarrier mapping manner based on an actual frequency band for communication.

Figure 12:
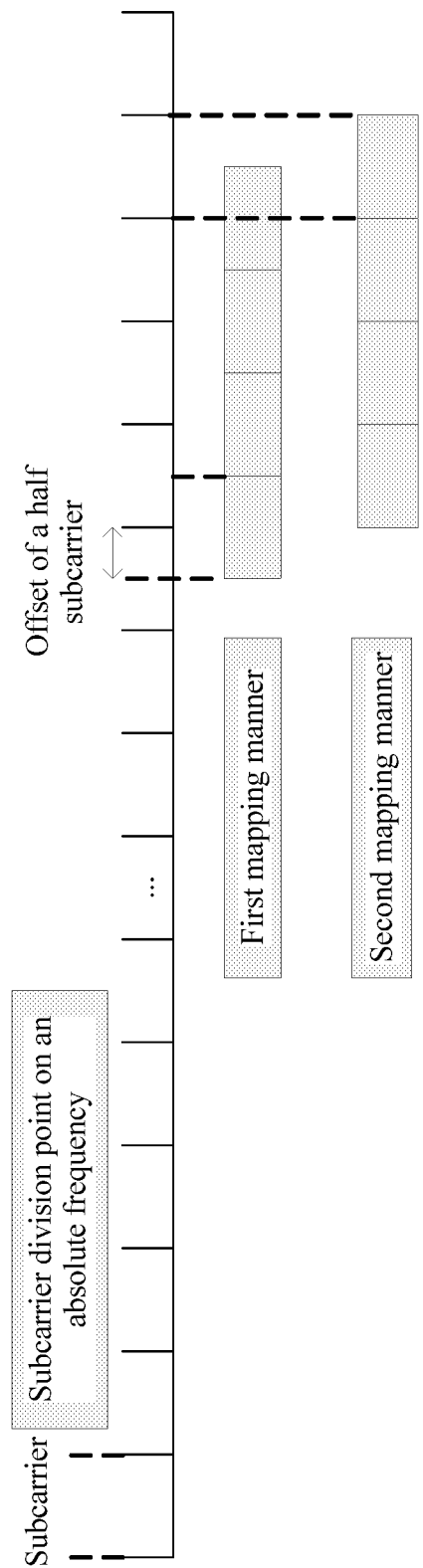
FIG. 12 is a schematic diagram of a first mapping manner and a second mapping manner.

Optionally, frequency offset of a half subcarrier exists between boundaries of the uplink subcarriers corresponding to the first mapping manner and subcarrier division points on the absolute frequency, and boundaries of the uplink subcarriers corresponding to the second mapping manner are aligned with the subcarrier division points on the absolute frequency. FIG. 12 is a schematic diagram of a first mapping manner and a second mapping manner. As shown in FIG. 12, a subcarrier division point exists between subcarriers in frequency domain, and may be referred to as a subcarrier division point on the absolute frequency. The division points may be considered as some fixed frequencies in frequency domain. Frequency offset (or may be considered as frequency offset of (N+½) subcarriers, where N is an integer) of a half subcarrier exists between the boundaries of the subcarriers corresponding to the first mapping manner and the division points. The subcarriers corresponding to the second mapping manner are aligned with the division points.

Step 902: The base station receives an uplink signal based on the uplink subcarrier mapping manner.

Optionally, when the uplink subcarrier mapping manner is the first mapping manner, the uplink signal is as follows:

$$s_l(t) = \sum_{k=-\lfloor N_{SC}/2 \rfloor}^{\lceil N_{SC}/2 \rceil - 1} a_{k^{(-)},l} \cdot e^{j2\pi(k+1/2)\Delta f(t-N_{CP,l}T_s)},$$

where $0 \le t < (N_{CP,l}+N) \times T_s$, $k^{(-)} = k + \lfloor N_{SC}/2 \rfloor$, N is a quantity of IFFT points (for example, equal to 2048, 4096, or another value), $N_{SC}$ is a quantity of frequency-domain subcarriers occupied by a current uplink signal of UE, $\Delta f$ is a subcarrier spacing (for example, equal to 15 KHz or 30 KHz), $a_{k,l}$ represents a signal value of a time-frequency resource element, k represents a frequency-domain subcarrier index, l represents a time-domain symbol index, $N_{CP,l}$ represents a cyclic prefix (CP) length of a symbol l, and $T_s = 1/(\Delta f \times N)$ represents a time-domain sampling point length. It can be learned that, when an IFFT operation of generating an uplink signal is performed, an uplink subcarrier division manner has frequency offset of a half subcarrier in comparison to a subcarrier division manner or a downlink subcarrier mapping manner.

Optionally, when the uplink subcarrier mapping manner is the second mapping manner, the uplink signal is as follows:

$$s_l(t) = \sum_{k=-\lfloor N_{SC}/2 \rfloor}^{\lceil N_{SC}/2 \rceil - 1} a_{k^{(-)},l} \cdot e^{j2\pi k \Delta f(t-N_{CP,l}T_s)},$$

where $0 \le t < (N_{CP,l}+N) \times T_s$, $k^{(-)} = k + \lfloor N_{SC}/2 \rfloor$, N is a quantity of IFFT points (for example, equal to 2048, 4096, or another value), $N_{SC}$ is a quantity of frequency-domain subcarriers occupied by a current uplink signal of UE, $\Delta f$ is a subcarrier spacing (for example, equal to 15 KHz or 30 KHz), $a_{k,l}$ represents a signal value of a time-frequency resource element, k represents a frequency-domain subcarrier index, l represents a time-domain symbol index, $N_{CP,l}$ represents a cyclic prefix (CP) length of a symbol l, and $T_s = 1/(\Delta f \times N)$ represents a time-domain sampling point length. It can be learned that, when an IFFT operation of generating an uplink signal is performed, an uplink subcarrier and a downlink subcarrier are aligned in a case of subcarrier frequency division, or an uplink subcarrier is aligned with a subcarrier frequency boundary in a subcarrier division manner.

According to the method, a subcarrier mapping manner can be adapted to different scenarios, for example, a scenario in which the NR system and LTE share an uplink carrier and a scenario in which the NR system and LTE do not share an uplink carrier or flexible duplex is used in the NR system, thereby resolving a problem of inter-subcarrier interference.

Figure 13:
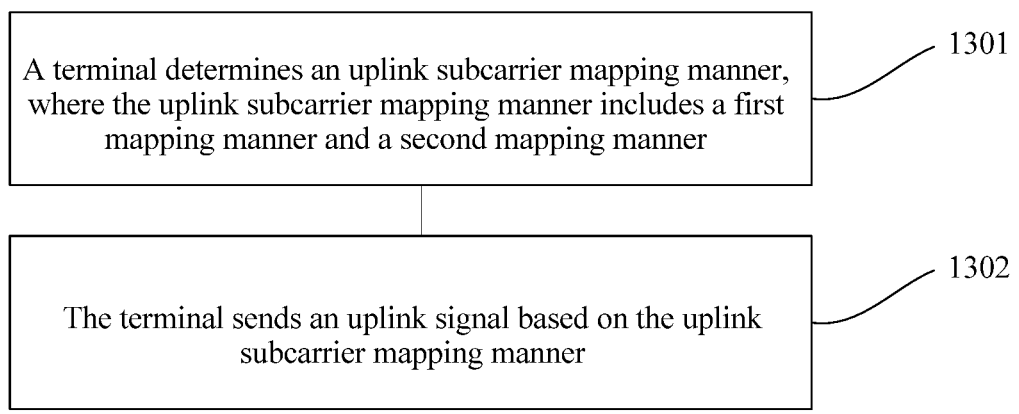
FIG. 13 is a schematic flowchart of a method for sending an uplink signal.

FIG. 13 is a schematic flowchart of a method for sending an uplink signal. As shown in FIG. 13, an embodiment of this application further provides a method for sending an uplink signal, and the method includes the following steps.

Step 1301: A terminal determines an uplink subcarrier mapping manner, where the uplink subcarrier mapping manner includes a first mapping manner and a second mapping manner.

Frequency domain offset of a half subcarrier exists between uplink subcarriers and downlink subcarriers that are corresponding to the first mapping manner, and a downlink carrier including the downlink subcarriers is paired with an uplink carrier including the uplink subcarriers. Specifically, the uplink carrier is paired with the downlink carrier in a case of frequency division or initial cell access.

FIG. 10 is a schematic diagram of a first mapping manner. As shown in FIG. 10, no subcarrier in a UL carrier is aligned with a subcarrier in a DL carrier. It may be considered that offset of a half subcarrier exists between the UL subcarrier and the DL subcarrier. The first mapping manner may be applied to a scenario in which NR and LTE share an LTE uplink carrier. In this case, in FIG. 10, DL may be an LTE downlink carrier and UL may be an NR uplink carrier. For example, there is a pair of LTE FDD uplink and downlink carriers on a low frequency band (for example, a frequency range of 800 MHz), and an NR downlink carrier or an NR TDD system is deployed on a high frequency band (for example, a frequency range of 3.5 GHz or even dozens of GHz). Because an NR base station may use a beamforming technology of a massive antenna array on the high frequency band to reduce a path loss caused by a high frequency, so as to enhance downlink coverage. However, the terminal generally uses an omnidirectional antenna due to a size limitation. In this case, there is a coverage problem on the high frequency band during uplink sending of the terminal. Therefore, the NR downlink carrier deployed on the high frequency band and the LTE uplink carrier on the low frequency band may jointly operate to serve an NR terminal. In this case, this is equivalent to that NR and LTE share the LTE uplink carrier. In other words, uplink transmission of NR is performed by using the LTE uplink carrier (or a part of the uplink carrier).

In a scenario in which NR and LTE share the LTE uplink carrier, subcarriers of NR and LTE need to be aligned, so as to implement resource coordination and resource multiplexing between the two systems, and interference between adjacent subcarriers is avoided or reduced. The LTE uplink subcarrier has frequency offset of a half subcarrier in comparison to a subcarrier division manner for an absolute frequency or a downlink subcarrier division manner of LTE. Therefore, an uplink subcarrier mapping manner of NR also needs to be consistent with an uplink subcarrier mapping manner of LTE. Alternatively, compared with the subcarrier division manner on the absolute frequency or the downlink subcarrier division manner of LTE, the NR uplink subcarrier needs to have frequency offset of a half subcarrier.

Uplink subcarriers and downlink subcarriers that are corresponding to the second mapping manner are aligned in frequency domain, and a downlink carrier including the downlink subcarriers is paired with an uplink carrier including the uplink subcarriers. Specifically, the uplink carrier is paired with the downlink carrier in a case of frequency division or initial cell access.

FIG. 11 is a schematic diagram of a second mapping manner. As shown in FIG. 11, subcarriers in a UL carrier are aligned with subcarriers in a DL carrier. It may be considered that no subcarrier offset exists between the UL subcarrier and the DL subcarrier. The second mapping manner may be applied to a scenario in which NR and LTE do not share an LTE uplink carrier, namely, a scenario in which NR independently operates, or may be applied to a scenario in which a flexible duplex technology is used in an NR system. In this case, in FIG. 11, DL may be an NR downlink carrier and UL may be an NR uplink carrier. Flexible duplex means that an uplink signal can be sent in some subframes on an NR FDD downlink carrier and a downlink signal can be sent in some subframes on an NR FDD uplink carrier. In this case, downlink sending interferes with uplink receiving in adjacent base stations or adjacent cells. A current solution includes interference coordination or interference cancellation. Regardless of which solution, uplink and downlink subcarriers need to be aligned. In addition, compared with a case in which primary deployment in LTE is a subcarrier spacing of 15 KHz, NR needs to support deployment of a plurality of types of subcarrier spacings. For example, a subcarrier spacing of 15 KHz is used to support a mobile broadband service, and a subcarrier spacing of 60 KHz is used to support an ultra-reliable and low latency service. An uplink subcarrier mapping manner of NR needs to be consistent with a subcarrier division manner for an absolute frequency or consistent with a downlink subcarrier mapping manner of NR. An advantage is that offset of different frequency values is not required for different subcarrier spacings. For example, offset of a half subcarrier 7.5 KHz is required for a subcarrier spacing of 15 KHz; offset of a half subcarrier 15 KHz is required for a subcarrier spacing of 30 KHz; and offset of a half subcarrier 30 KHz is required for a subcarrier spacing of 60 KHz.

Further, when determining the uplink subcarrier mapping manner, the terminal may determine the uplink subcarrier mapping manner based on a predefined uplink subcarrier mapping manner in a standard, or may determine the uplink subcarrier mapping manner based on an internal algorithm. For example, the terminal determines the uplink subcarrier mapping manner based on a correspondence between a frequency band and the uplink subcarrier mapping manner. In an implementation, a low frequency band (for example, a frequency range of 800 MHz) is corresponding to the first mapping manner, and a high frequency band (for example, a frequency range of 3.5 GHz) is corresponding to the second mapping manner. In this case, the terminal may determine the uplink subcarrier mapping manner based on an actual frequency band for communication. Alternatively, the terminal may determine the uplink subcarrier mapping manner by receiving configuration information sent by the base station. The configuration information instructs the terminal to use the first mapping manner or the second mapping manner.

Optionally, frequency offset of a half subcarrier exists between boundaries of the uplink subcarriers corresponding to the first mapping manner and subcarrier division points on the absolute frequency, and boundaries of the uplink subcarriers corresponding to the second mapping manner are aligned with the subcarrier division points on the absolute frequency. FIG. 12 is a schematic diagram of a first mapping manner and a second mapping manner. As shown in FIG. 12, a subcarrier division point exists between subcarriers in frequency domain, and may be referred to as a subcarrier division point on the absolute frequency. The division points may be considered as some fixed frequencies in frequency domain. Frequency offset (or may be considered as frequency offset of (N+½) subcarriers, where N is an integer) of a half subcarrier exists between the boundaries of the subcarriers corresponding to the first mapping manner and the division points. The subcarriers corresponding to the second mapping manner are aligned with the division points.

Step 1302: The terminal sends an uplink signal based on the uplink subcarrier mapping manner.

Optionally, when the uplink subcarrier mapping manner is the first mapping manner, the uplink signal is as follows:

$$s_l(t) = \sum_{k=-\lfloor N_{SC}/2 \rfloor}^{\lceil N_{SC}/2 \rceil - 1} a_{k^{(-)},l} \cdot e^{j2\pi(k+1/2)\Delta f(t-N_{CP,l}T_s)},$$

where $0 \leq t < (N_{CP,l}+N) \times T_s$, $k^{(-)}=k+\lfloor N_{SC}/2 \rfloor$, N is a quantity of IFFT points (for example, equal to 2048, 4096, or another value), $N_{SC}$ is a quantity of frequency-domain subcarriers occupied by a current uplink signal of UE, $\Delta f$ is a subcarrier spacing (for example, equal to 15 KHz or 30 KHz), $a_{k,l}$ represents a signal value of a time-frequency resource element, k represents a frequency-domain subcarrier index, l represents a time-domain symbol index, $N_{CP,l}$ represents a cyclic prefix (CP) length of a symbol l, and $T_s=1/(\Delta f \times N)$ represents a time-domain sampling point length. It can be learned that, when an IFFT operation of generating an uplink signal is performed, an uplink subcarrier division manner has frequency offset of a half subcarrier in comparison to a subcarrier frequency division manner or a downlink subcarrier mapping manner.

Optionally, when the uplink subcarrier mapping manner is the second mapping manner, the uplink signal is as follows:

$$s_l(t) = \sum_{k=-\lfloor N_{SC}/2 \rfloor}^{\lceil N_{SC}/2 \rceil - 1} a_{k^{(-)},l} \cdot e^{j2\pi k \Delta f(t-N_{CP,l}T_s)},$$

where $0 \leq t < (N_{CP,l}+N) \times T_s$, $k^{(-)}=k+\lfloor N_{SC}/2 \rfloor$, N is a quantity of IFFT points (for example, equal to 2048, 4096, or another value), $N_{SC}$ is a quantity of frequency-domain subcarriers occupied by a current uplink signal of UE, $\Delta f$ is a subcarrier spacing (for example, equal to 15 KHz or 30 KHz), $a_{k,l}$ represents a signal value of a time-frequency resource element, k represents a frequency-domain subcarrier index, l represents a time-domain symbol index, $N_{CP,l}$ represents a cyclic prefix (CP) length of a symbol l, and $T_s=1/(\Delta f \times N)$ represents a time-domain sampling point length. It can be learned that, when an IFFT operation of generating an uplink signal is performed, an uplink subcarrier and a downlink subcarrier are aligned in a case of subcarrier frequency division, or an uplink subcarrier is aligned with a subcarrier frequency boundary in a subcarrier division manner.

According to the method, a subcarrier mapping manner can be adapted to different scenarios, for example, a scenario in which the NR system and LTE share an uplink carrier and a scenario in which the NR system and LTE do not share an uplink carrier or flexible duplex is used in the NR system, thereby resolving a problem of inter-subcarrier interference.

An embodiment of this application provides a base station, including: a determining module, configured to determine an uplink subcarrier mapping manner, where the uplink subcarrier mapping manner includes a first mapping manner and a second mapping manner, frequency domain offset of a half subcarrier exists between uplink subcarriers and downlink subcarriers that are corresponding to the first mapping manner, uplink subcarriers and downlink subcarriers that are corresponding to the second mapping manner are aligned in frequency domain, and a downlink carrier including the downlink subcarriers is paired with an uplink carrier including the uplink subcarriers; and a receiving module, configured to receive an uplink signal based on the uplink subcarrier mapping manner.

When the uplink subcarrier mapping manner is the first mapping manner, the uplink signal is as follows:

$$s_l(t) = \sum_{k=-\lfloor N_{SC}/2 \rfloor}^{\lceil N_{SC}/2 \rceil - 1} a_{k^{(-)},l} \cdot e^{j2\pi(k+1/2)\Delta f(t-N_{CP,l}T_s)},$$

where $0 \leq t < (N_{CP,l}+N) \times T_s$, $k^{(-)}=k+\lfloor N_{SC}/2 \rfloor$, N is a quantity of IFFT points, $N_{SC}$ is a quantity of frequency-domain subcarriers occupied by a current uplink signal of UE, $\Delta f$ is a subcarrier spacing, $a_{k,l}$ represents a signal value of a time-frequency resource element, k represents a frequency-domain subcarrier index, l represents a time-domain symbol index, $N_{CP,l}$ represents a cyclic prefix length of a symbol l, and $T_s=1/(\Delta f \times N)$ represents a time-domain sampling point length.

Alternatively, when the uplink subcarrier mapping manner is the second mapping manner, the uplink signal is as follows:

$$s_l(t) = \sum_{k=-\lfloor N_{SC}/2 \rfloor}^{\lceil N_{SC}/2 \rceil - 1} a_{k^{(-)},l} \cdot e^{j2\pi k \Delta f(t-N_{CP,l}T_s)},$$

where $0 \leq t < (N_{CP,l}+N) \times T_s$, $k^{(-)}=k+\lfloor N_{SC}/2 \rfloor$, N is a quantity of IFFT points, $N_{SC}$ is a quantity of frequency-domain subcarriers occupied by a current uplink signal of UE, $\Delta f$ is a subcarrier spacing, $a_{k,l}$ represents a signal value of a time-frequency resource element, k represents a frequency-domain subcarrier index, l represents a time-domain symbol index, $N_{CP,l}$ represents a cyclic prefix length of a symbol l, and $T_s=1/(\Delta f \times N)$ represents a time-domain sampling point length.

An embodiment of this application provides a terminal, including: a determining module, configured to determine an uplink subcarrier mapping manner, where the uplink subcarrier mapping manner includes a first mapping manner and a second mapping manner, frequency domain offset of a half subcarrier exists between uplink subcarriers and downlink subcarriers that are corresponding to the first mapping manner, uplink subcarriers and downlink subcarriers that are corresponding to the second mapping manner are aligned in frequency domain, and a downlink carrier including the downlink subcarriers is paired with an uplink carrier including the uplink subcarriers; and a sending module, configured to send an uplink signal based on the uplink subcarrier mapping manner.

When the uplink subcarrier mapping manner is the first mapping manner, the uplink signal is as follows:

$$s_l(t) = \sum_{k=-\lfloor N_{SC}/2 \rfloor}^{\lceil N_{SC}/2 \rceil - 1} a_{k^{(-)},l} \cdot e^{j2\pi(k+1/2)\Delta f(t-N_{CP,l}T_s)},$$

where $0 \leq t < (N_{CP,l}+N) \times T_s$, $k^{(-)}=k+\lfloor N_{SC}/2 \rfloor$, N is a quantity of IFFT points, $N_{SC}$ is a quantity of frequency-domain subcarriers occupied by a current uplink signal of UE, $\Delta f$ is a subcarrier spacing, $a_{k,l}$ represents a signal value of a time-frequency resource element, k represents a frequency-domain subcarrier index, l represents a time-domain symbol index, $N_{CP,l}$ represents a cyclic prefix length of a symbol l, and $T_s=1/(\Delta f \times N)$ represents a time-domain sampling point length.

Alternatively, when the uplink subcarrier mapping manner is the second mapping manner, the uplink signal is as follows:

$$s_l(t) = \sum_{k=-\lfloor N_{SC}/2 \rfloor}^{\lceil N_{SC}/2 \rceil - 1} a_{k^{(-)},l} \cdot e^{j2\pi k \Delta f(t - N_{CP,l} T_s)},$$

where $0 \leq t < (N_{CP,l}+N) \times T_s$, $k^{(-)}=k+\lfloor N_{SC}/2 \rfloor$, N is a quantity of IFFT points, $N_{SC}$ is a quantity of frequency-domain subcarriers occupied by a current uplink signal of UE, $\Delta f$ is a subcarrier spacing, $a_{k,l}$ represents a signal value of a time-frequency resource element, k represents a frequency-domain subcarrier index, l represents a time-domain symbol index, $N_{CP,l}$ represents a cyclic prefix length of a symbol l, and $T_s=1/(\Delta f \times N)$ represents a time-domain sampling point length.

Method or algorithm steps described with reference to the content disclosed in this application may be implemented by hardware, or may be implemented by a processor by executing a software instruction. The software instruction may include a corresponding software module. The software module may be stored in a RAM, a flash, a ROM, an EPROM, an EEPROM, a register, a hard disk, a removable hard disk, a CD-ROM, or any other form of storage medium known in the art. For example, a storage medium is coupled to a processor, so that the processor can read information from the storage medium and write information into the storage medium. Certainly, the storage medium may be a component of the processor. The processor and the storage medium may be located in an ASIC. In addition, the ASIC may be located in user equipment. Certainly, the processor and the storage medium may exist in the user equipment as discrete components.

The foregoing embodiments may be all or partially implemented by using software, hardware, firmware, or any combination thereof. When software is used to implement the embodiments, the embodiments may be all or partially implemented in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or other programmable apparatuses. The computer instructions may be stored in a computer readable storage medium, or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or may be a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, units and algorithm steps in the examples described with reference to the embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   receiving, by a first device, indication information from a network device, wherein the indication information comprises information about a first offset value, and the first offset value is 7.5 KHz;
   obtaining a second frequency of a carrier based on an absolute radio frequency channel number; and
   obtaining a first frequency of the carrier by shifting the second frequency by the first offset value; and
   wherein a relationship between the absolute radio frequency channel number and the second frequency is given by a relation as follows:

$F_{UL}=F_{UL\_low}+Y^*(N_{UL}-N_{Offs-UL})$, wherein $F_{UL}$ is the second frequency, $N_{UL}$ is the absolute radio frequency channel number, $F_{UL\_low}$ is a lowest frequency value in a new radio (NR) frequency range, $N_{Offs-UL}$ is an offset value in the NR frequency range, and Y is a value greater than 0 and determined based on a NR channel raster.

2. The method according to claim 1, wherein subcarriers of the carrier correspond to frequencies other than the second frequency.

3. The method according to claim 1, wherein:
   the second frequency is an original carrier center frequency of the carrier.

4. The method according to claim 1, wherein the carrier is symmetric with respect to the first frequency of the carrier.

5. The method according to claim 1, wherein the carrier comprises a subcarrier on the first frequency.

6. The method according to claim 1, wherein:
the first frequency is an actual carrier center frequency of the carrier.

7. The method according to claim 1, wherein the carrier is an uplink carrier.

8. The method according to claim 1, wherein the indication information is carried in a system message or radio resource control (RRC) signaling.

9. The method according to claim 1, wherein:
the second frequency is a carrier center frequency of the carrier before the shifting.

10. The method according to claim 1, wherein:
the first frequency is a carrier center frequency of the carrier after shifting is performed.

11. A non-transitory computer-readable storage medium, comprising an instruction, wherein when running on a computer, the instruction enables the computer to perform the method according to claim 1.

12. A method, comprising:
generating, by a network device, indication information comprising information about a first offset value, wherein the first offset value is 7.5 KHz, the first offset value is usable to obtain a first frequency of a carrier, and the carrier corresponds to an absolute radio frequency channel number; and
sending, by the network device, the indication information to a first device;
wherein the first frequency is obtained by shifting a second frequency of the carrier by the first offset value, and the second frequency is obtained based on the absolute radio frequency channel number; and
wherein a relationship between the absolute radio frequency channel number and the second frequency is given by a relation as follows:

$$F_{UL}=F_{UL\_low}+Y*(N_{UL}-N_{Offs-UL}),$$

wherein $F_{UL}$ is the second frequency, $N_{UL}$ is the absolute radio frequency channel number, $F_{UL\_low}$ is a lowest frequency value in a new radio (NR) frequency range, $N_{Offs-UL}$ is an offset value in the NR frequency range, and Y is a value greater than 0 and determined based on a NR channel raster.

13. The method according to claim 12, wherein subcarriers of the carrier correspond to frequencies other than the second frequency.

14. The method according to claim 12, wherein:
the second frequency is an original carrier center frequency of the carrier.

15. The method according to claim 12, wherein the carrier is symmetric with respect to the first frequency of the carrier.

16. The method according to claim 12, wherein the carrier comprises a subcarrier on the first frequency.

17. The method according to claim 12, wherein:
the first frequency is an actual carrier center frequency of the carrier.

18. The method according to claim 12, wherein the carrier is an uplink carrier.

19. The method according to claim 12, wherein the indication information is carried in a system message or radio resource control (RRC) signaling.

20. The method according to claim 12, wherein:
the second frequency is a carrier center frequency of the carrier before the shifting.

21. The method according to claim 12, wherein:
the first frequency is a carrier center frequency of the carrier after a shifting is performed.

22. A non-transitory computer-readable storage medium, comprising an instruction, wherein when running on a computer, the instruction enables the computer to perform the method according to claim 12.

23. A device, comprising:
a transceiver, configured to receive indication information from a network device, wherein the indication information comprises information about a first offset value, and the first offset value is 7.5 KHz;
a processor coupled to the transceiver; and
a non-transitory computer-readable storage medium storing a program to be executed by the processor, the program including instructions for:
obtaining a second frequency of a carrier based on an absolute radio frequency channel number; and
obtaining a first frequency of the carrier by shifting the second frequency by the first offset value;
wherein a relationship between the absolute radio frequency channel number and the second frequency is given by a relation as follows:

$$F_{UL}=F_{UL\_low}+Y*(N_{UL}-N_{Offs-UL}),$$

wherein $F_{UL}$ is the second frequency, $N_{UL}$ is the absolute radio frequency channel number, $F_{UL\_low}$ is a lowest frequency value in a new radio (NR) frequency range, $N_{Offs-UL}$ is an offset value in the NR frequency range, and Y is a value greater than 0 and determined based on a NR channel raster.

24. The device according to claim 23, wherein subcarriers of the carrier are located on frequencies other than the second frequency.

25. The device according to claim 23, wherein the carrier is symmetric with respect to the first frequency of the carrier.

26. The device according to claim 23, wherein the carrier comprises a subcarrier on the first frequency.

27. A network device, comprising:
a processor;
a non-transitory computer-readable storage medium storing a program to be executed by the processor, the program including instructions for:
generating indication information comprising information about a first offset value, wherein the first offset value is 7.5 KHz, the first offset value is usable to obtain a first frequency of a carrier, and the carrier corresponds to an absolute radio frequency channel number; and
a transceiver coupled to the processor, wherein the transceiver is configured to send the indication information to a first device;
wherein the first frequency is obtainable by shifting a second frequency of the carrier by the first offset value, and the second frequency is obtainable based on the absolute radio frequency channel number; and
wherein a relationship between the absolute radio frequency channel number and the second frequency is given by a relation as follows:

$$F_{UL}=F_{UL\_low}+Y*(N_{UL}-N_{Offs-UL}),$$

wherein $F_{UL}$ is the second frequency, $N_{UL}$ is the absolute radio frequency channel number, $F_{UL\_low}$ is a lowest frequency value in a new radio (NR) frequency range, $N_{Offs-UL}$ is an offset value in the NR frequency range, and Y is a value greater than 0 and determined based on a NR channel raster.

28. The network device according to claim 27, wherein subcarriers of the carrier are located on frequencies other than the second frequency.

29. The network device according to claim 27, wherein the carrier is symmetric with respect to a first frequency of the carrier.

30. The network device according to claim 27, wherein the carrier comprises a subcarrier on the first frequency.

* * * * *